(12) United States Patent
Ye

(10) Patent No.: US 11,717,759 B2
(45) Date of Patent: *Aug. 8, 2023

(54) CAMERA VIEW SELECTION PROCESSOR FOR PASSIVE SPECTATOR VIEWING

(71) Applicant: Sony Interactive Entertainment Inc., Tokyo (JP)

(72) Inventor: Xiaoyong Ye, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,391

(22) Filed: Mar. 1, 2022

(65) Prior Publication Data

US 2022/0184510 A1 Jun. 16, 2022

Related U.S. Application Data

(63) Continuation of application No. 16/886,727, filed on May 28, 2020, now Pat. No. 11,260,307.

(51) Int. Cl.
| | |
|---|---|
| *A63F 13/86* | (2014.01) |
| *A63F 13/213* | (2014.01) |
| *A63F 13/352* | (2014.01) |
| *G06N 20/00* | (2019.01) |

(52) U.S. Cl.
CPC ............ *A63F 13/86* (2014.09); *A63F 13/213* (2014.09); *A63F 13/352* (2014.09); *G06N 20/00* (2019.01); *A63F 2300/577* (2013.01)

(58) Field of Classification Search
None
See application file for complete search history.

(56) References Cited

U.S. PATENT DOCUMENTS

| | | | | |
|---|---|---|---|---|
| 9,814,987 | B1 * | 11/2017 | Lawson | A63F 13/65 |
| 11,082,666 | B1 * | 8/2021 | Florentino | A63F 13/35 |
| 2003/0038805 | A1 * | 2/2003 | Wong | A63F 13/12 |
| | | | | 345/473 |
| 2010/0167809 | A1 * | 7/2010 | Perlman | H04L 65/403 |
| | | | | 463/43 |
| 2018/0165914 | A1 * | 6/2018 | Sternberg | G07F 17/3225 |

\* cited by examiner

*Primary Examiner* — Jason T Yen
(74) *Attorney, Agent, or Firm* — Penilla IP, APC

(57) ABSTRACT

Methods and systems for enhancing viewing experience of a spectator includes receiving a request for viewing game play of a video game executing at a game cloud server. Responsive to the request, the spectator is initially provided with one of a player camera view or an active spectator camera view generated for the game play. The system dynamically switches between the player camera view and the active spectator camera view based on context of action occurring in the player camera view and the active spectator camera view. The dynamic switching correlates with time of action occurring in the game scene of the video game.

15 Claims, 11 Drawing Sheets

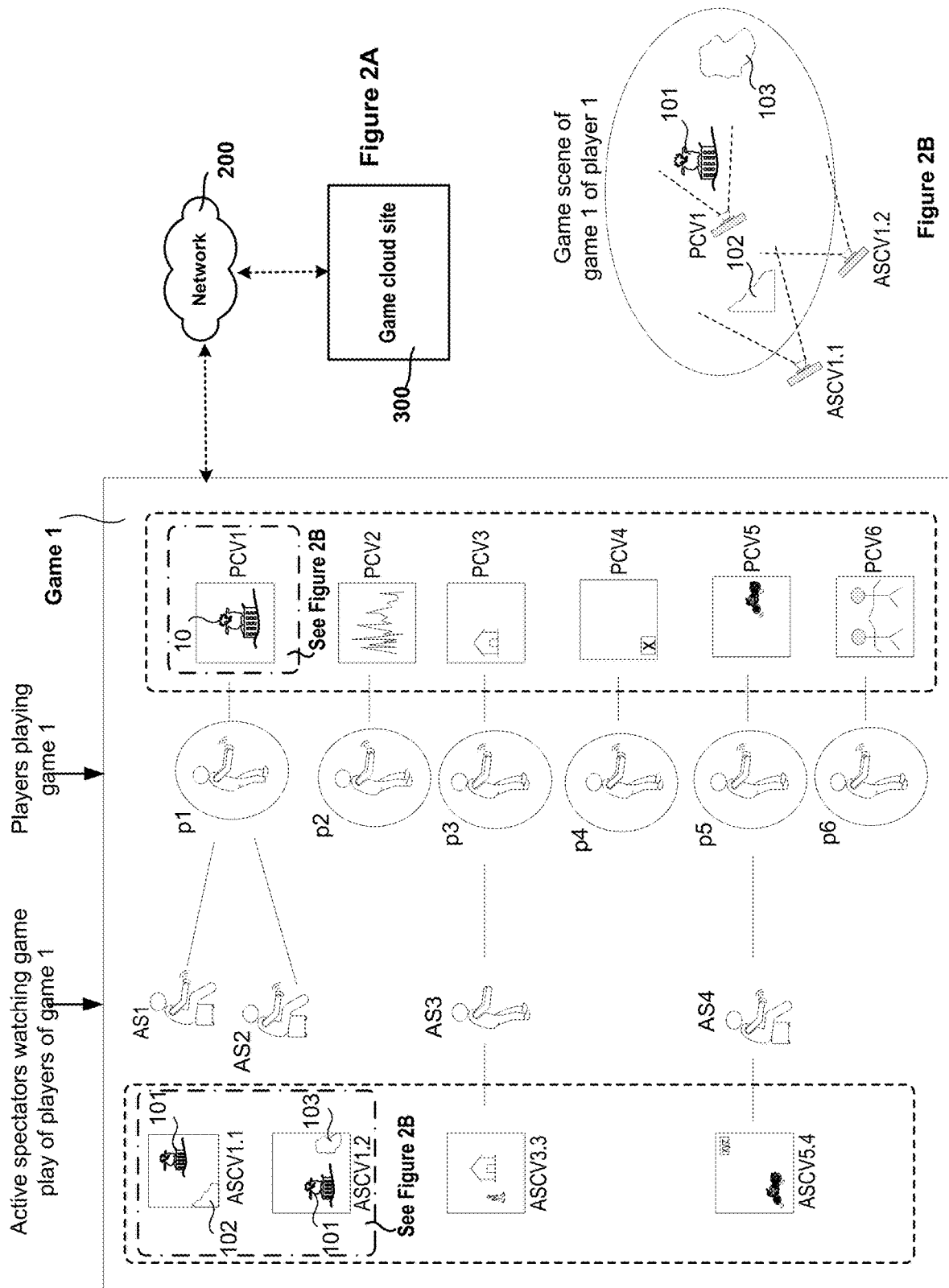

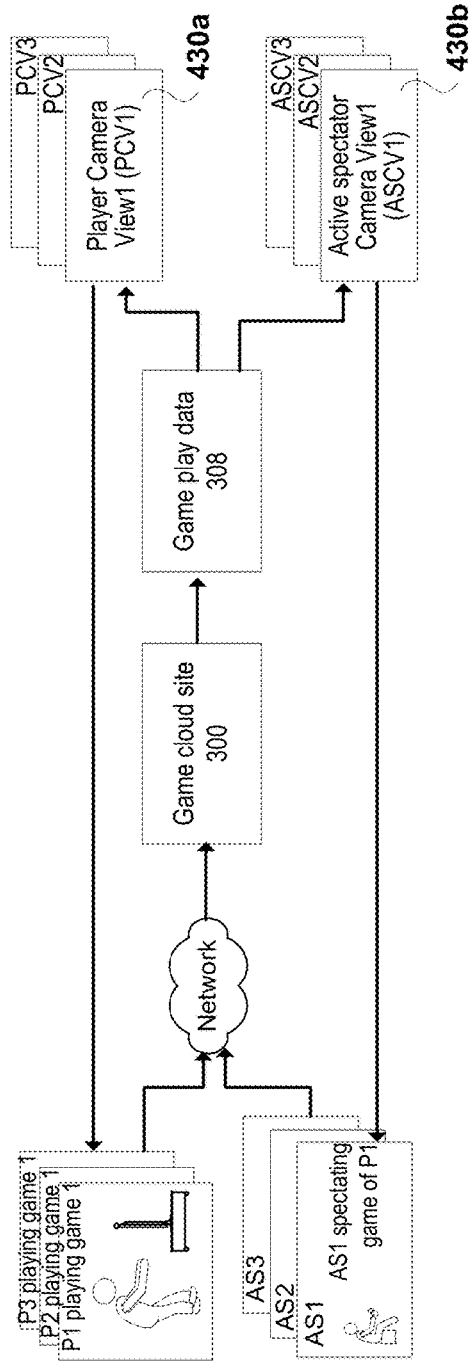
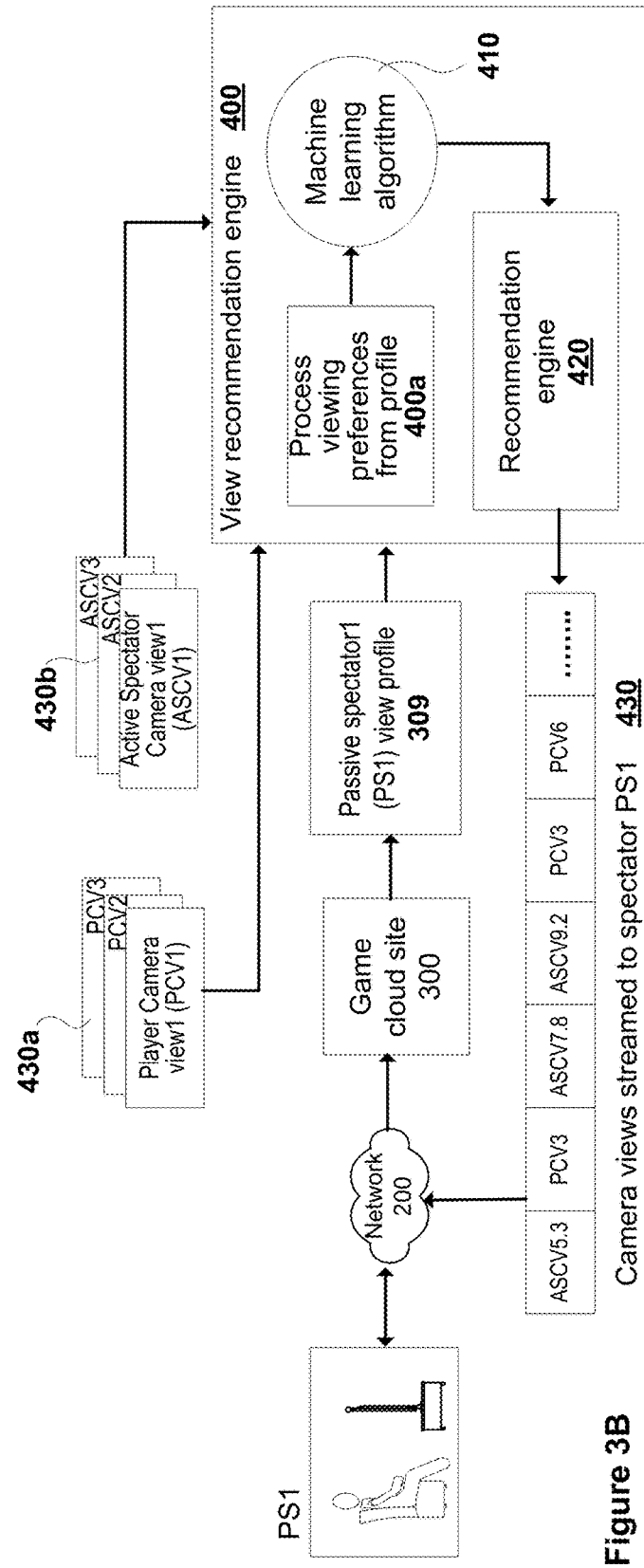
Figure 3A
Figure 3B

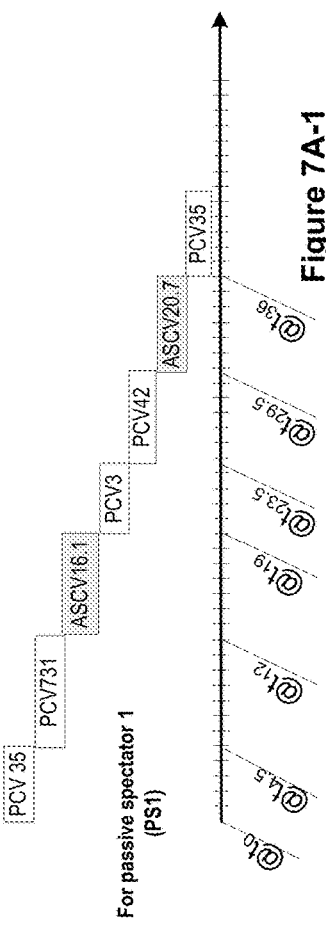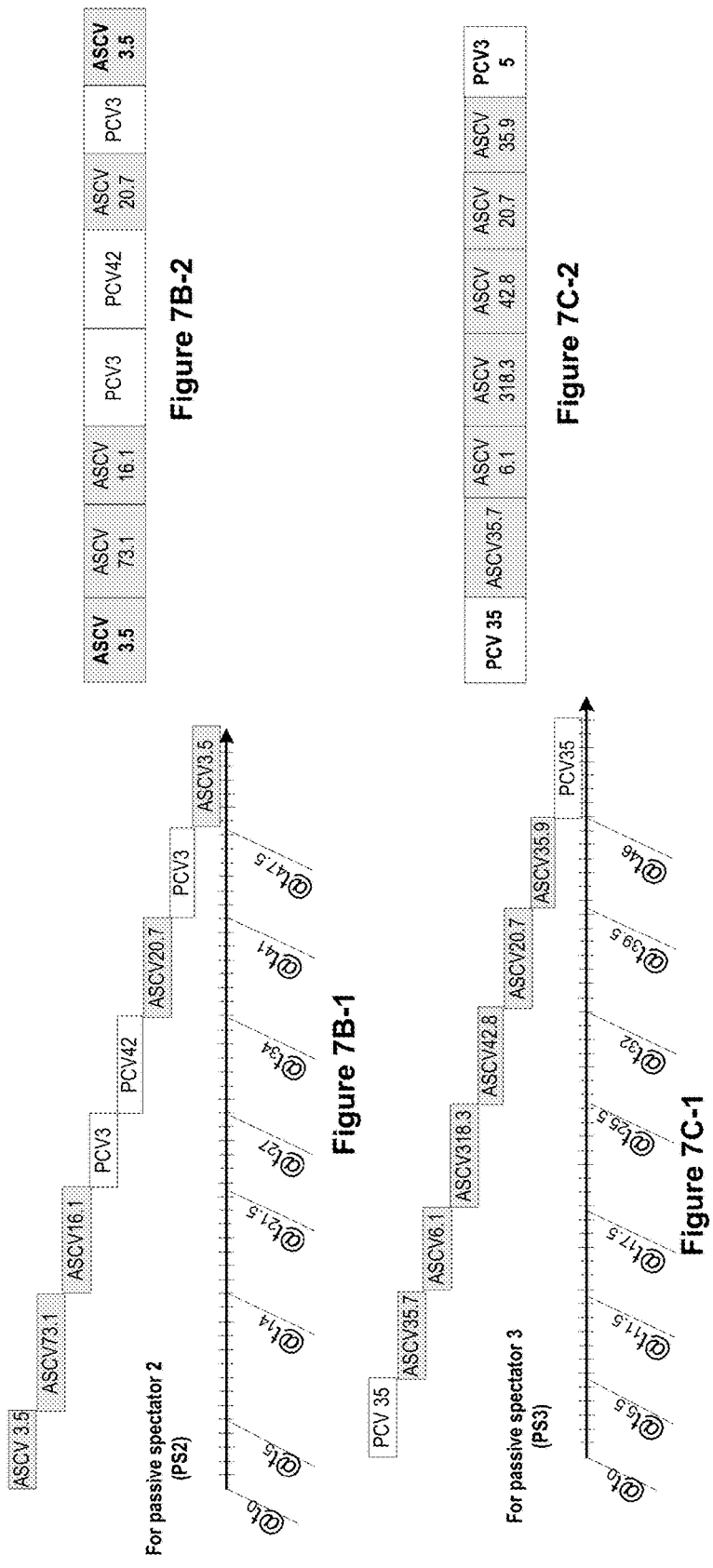
Figure 7A-1, Figure 7A-2, Figure 7B-1, Figure 7B-2, Figure 7C-1, Figure 7C-2

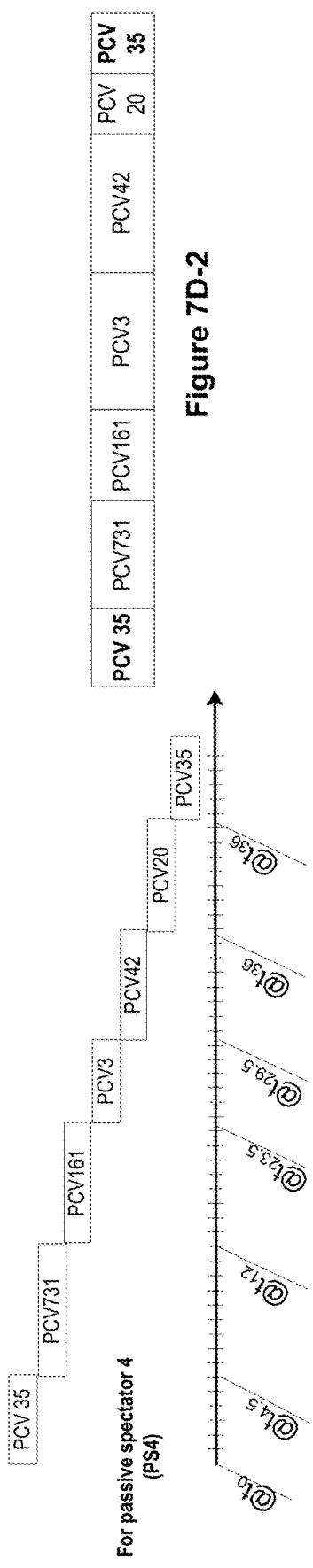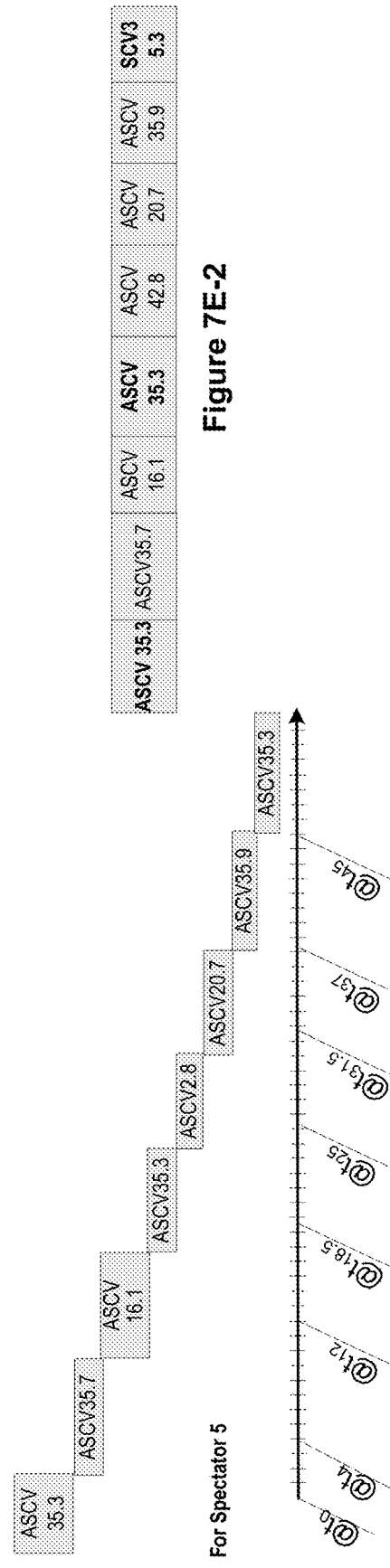

CAMERA VIEW SELECTION PROCESSOR FOR PASSIVE SPECTATOR VIEWING

CLAIM OF PRIORITY

This application is a continuation of and claims priority to and the benefit of commonly owned patent application, U.S. Ser. No. 16/886,727, filed on May 28, 2020, entitled "Camera View Selection Processor For Passive Spectator Viewing," the disclosure of which is incorporated herein by reference in its entirety for all purposes.

TECHNICAL FIELD

The present disclosure relates to providing a recommendation stream of game play of a video game to spectators, and more specifically to providing the recommendation stream with different camera views of a game scene capturing different aspects of game play.

BACKGROUND OF THE DISCLOSURE

Video games have gained popularity in recent years. The video games are of two types. In one type, the video game is executed on a client device (e.g., mobile device, PC, a laptop computer, etc.,) and the client is connected to a server so that metadata related to game play can be shared with the server. Another type of video game is streaming video game, wherein the video game is executed on one or more servers that are part of a game cloud and the game data is streamed to the client device for rendering. Streaming video games, especially, massive multi-player online (MMO) games are more popular as they can be accessed by a vast number of users (e.g., players, spectators) simultaneously via a network of computers distributed across a wide geography.

A growing trend in the video gaming is the concept of cloud gaming. The cloud gaming enables the video game to be executed on one or more cloud servers using resources available in the game cloud system and accessed by a plurality of players and spectators from anywhere where network connectivity is available. Massive multi-player online game (MMO) games are examples of video games that take advantage of cloud gaming, and such video games are becoming increasingly popular. With the current trend of sophisticated graphics included in the video games (e.g., MMO games), the video games require a large number of computing resources and the cloud gaming provides the necessary computing resources in a centralized location to meet the demands of the modern game engines. The video game executes on the one or more servers of the game cloud system and streams the game play data to the client devices of the users. The advantage of executing the video games on the game cloud system is that the resources required for the execution of the game are centralized, thereby freeing up the client devices of the users from having to own specific hardware to execute the video game. The client devices are only required to own sufficient hardware to receive, decode and render the game play, while enjoying high quality video gaming experience.

One or more players play the video game and a plurality of spectators may tune in to watch the game play of the one or more players. Players inputs provided during game play are used to update a game state of the video game and generate game play data that is streamed to the client devices of the one or more players and the spectators. The game play data is used to render game scenes of the video game at the respective client devices of the players and spectators. As the popularity of cloud gaming continues, the sophistication in the graphics and hence the quality of the video game configured for cloud gaming also continues to grow.

It is in this context that embodiments of the disclosure arise.

SUMMARY

Embodiments of the present disclosure relate to systems and methods for recommending streams of game play of a video game to spectators that are interested in the game play of the video game. The video game may be a single user video game or a massive multiplayer online (MMO) video game that can be executed on a cloud gaming system and accessed for game play by a plurality of players that are co-located or remotely located (i.e., distributed across different geolocations). Game inputs provided by the players are used to affect an outcome of the game and to generate game play data. The game play data is processed to generate frames of game scenes, which are streamed to the client devices of the players for rendering. The frames of game scenes that are provided to each player provides a camera view (i.e., "player camera view) of the game scene of the video game from the perspective of the respective player. A plurality of spectators may be interested in watching the game play of the video game. Some of the plurality of spectators may choose to actively participate in the viewing of the game play of the video game by choosing a particular camera view of the game play to watch, while other spectators may just select the video game for watching. For the spectators that actively participate in selecting a particular camera view (referred to herein as "active spectators"), the system may generate the particular camera view (i.e., active spectator camera view) and forward the same to the spectators requesting the particular camera view. For spectators that just select the video game to spectate without actively specifying any particular camera view, the system determines which one of the camera views (i.e., player camera view or the active spectator camera view) to provide to these spectators. Those spectators that just select to watch the video game without actively selecting any particular camera view are also referred to herein as "passive spectators". For a passive spectator, the system switches between the different camera views generated for the video game, so that at any given time, the passive spectator is presented with either the player camera view of a player or the active spectator camera view of an active spectator. The switching between the two camera views is based on context of an action occurring in the respective camera views. During the course of the video game, the passive spectator is presented with a plurality of camera views (either player camera view or active spectator camera view), wherein each camera view presents a view of an action occurring in the video game. The plurality of camera views provided to the passive spectators constitutes a recommendation stream. The camera views included in the recommendation stream is a subset of camera views captured during game play and provides interesting details of the video game to the passive spectator.

In one implementation, a method is provided. The method includes executing a video game at a game cloud server, in response to a play request for game play of a video game received from a player. The execution of the video game results in generation of game play data, which is processed to generate a player camera view for providing to the player during game play and an active spectator camera view for providing to an active spectator accessing the video game to spectate the game play of the player. A request for viewing the game play of the video game is received from a passive spectator. Responsive to the request, the passive spectator is presented with one of a player camera view or an active spectator camera view. The presenting includes dynamically switching between the player camera view and the active spectator camera view. The dynamic switching is based on context of an action occurring in the player camera view and the active spectator camera view. The dynamic switching is performed without any input from the passive spectator.

In one implementation, the player camera view and the active spectator camera view are dynamically being updated during game play to capture a view of the action occurring in the video game.

In one implementation, the player camera view or the active spectator camera view selected for dynamic switching correlates with a time of the action occurring in the video game.

In one implementation, the dynamic switching to the player camera view or the active spectator camera view is further based on a profile of the passive spectator.

In one implementation, the profile of the passive spectator identifies viewing preferences of the passive spectator collected over time based on content viewed by the passive spectator.

In one implementation, the viewing preferences of the passive spectator are dynamically adjusted in the profile based on preference inputs received from the passive spectator.

In one implementation, the action occurring in the video game is based on an activity performed by the player, and player camera view and the active spectator camera view capture the action related to the activity.

In one implementation, the dynamic switching continues during the game play of the video game and results in generation of a recommendation stream provided to the passive spectator. The recommendation stream includes a combination of one or more player camera views and/or one or more active spectator camera views. Each player camera view and each active spectator camera view is dynamically generated and includes a distinct action occurring in the video game.

In one implementation, a plurality of actions occur during game play of the video game with each action of the plurality of actions being associated with one or more player camera views and one or more active spectator camera views. The one or more player camera views and the one or more active spectator camera views associated with each action captures distinct views of a game scene in which the corresponding action is occurring in the video game. The one or more player camera views and the one or more active spectator camera views generated for the action include sufficient data to construct a three-dimensional representation of the game scene of the video game associated with the action.

In one implementation, processing the game play data includes re-executing the video game to generate the active spectator camera view that captures a desired angle of the action occurring in the video game as specified in the input of the active spectator. The re-execution is done using the game play data available at a time when the input from the active spectator is received.

In one implementation, the player camera view captures a view of the action occurring in the video game from a perspective of the player. The active spectator camera view is generated based on an input provided by the active spectator. The active spectator camera view captures a view of the action different from a view of the action captured in the player camera view.

In one implementation, the dynamic switching includes presenting the player camera view or the active spectator camera view to the passive spectator for a duration of the action occurring in the video game.

In one implementation, the game play data is an aggregate of game play data of a plurality of players that are currently playing the video game. The aggregate game play data is used to generate player camera views for the plurality of players and active spectator camera views for the active spectators, for each action occurring in the video game. Each player camera view captures a view of the video game from a perspective of a player of the plurality of players, using game inputs of the player, and each active spectator camera view captures a view of the video game in accordance to view specification provided in input of a specific active spectator. The dynamic switching includes presenting only player camera views, or only active spectator camera views, or a combination of player camera views and active spectator camera views capturing views of game scenes associated with different actions occurring in the video game.

In one implementation, the dynamic switching is further based on profile of the passive spectator.

In one implementation, the dynamic switching is performed by generating a recommendation model using machine learning logic. The recommendation model is generated and trained using game play data of the video game. The game play data is generated in response to game inputs of the player an inputs of the active spectator. An output from the recommendation model that correlates with context of action occurring in the video game, is identified. The output is used to identify the player camera view or the active spectator camera view for dynamic switching.

In another implementation, a method is disclosed. The method includes detecting a request for viewing a video game that is executing at a game cloud server. The request is received from a passive spectator. A plurality of camera views generated during game play of the video game is identified. The plurality of camera views includes a player camera view generated for each player and an active spectator camera view generated for each active spectator following the game play of the video game, wherein each camera view of the plurality of camera views captures a distinct view of a game scene of the video game associated with a corresponding action occurring in the video game. The method further includes dynamically switching between a player camera view and an active spectator camera view selected from the plurality of camera views associated with each action, for returning to the passive spectator in response to the request. The dynamic switching occurs without any input from the passive spectator and is based on context of said action occurring in the respective player camera view and the active spectator camera view selected for said action.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIG. 2A illustrates a simplified view of different camera views captured for the game play of a video game used for providing recommendation stream, in accordance with one implementation of the present disclosure. FIG. 2B illustrates an expanded view depicting the different camera views captured for different users—players, active spectators, in accordance with one implementation of the present disclosure.

FIG. 3A illustrates a simplified block diagram of a game cloud system for collecting and processing game inputs from a plurality of players and inputs from a plurality of active spectators to generate corresponding player camera views and active spectator camera views for each of the plurality of players and active spectators, in accordance with one implementation of the present disclosure.

FIG. 3B illustrates a simplified block diagram of a game cloud system used for providing different camera views to a passive spectator, in accordance with one implementation of the present disclosure.

FIGS. 7A-1 through 7E-1 illustrate sample of switched camera views presented to different passive spectators for viewing game play of the video game, in accordance with one implementation of the present disclosure. FIGS. 7A-2 through 7E-2 illustrate sample recommendation streams generated from the switched camera views identified in FIGS. 7A-1 through 7E-1 provided to the different passive spectators by a view recommendation engine, in accordance with one implementation of the present disclosure.

DETAILED DESCRIPTION

Figure 1:
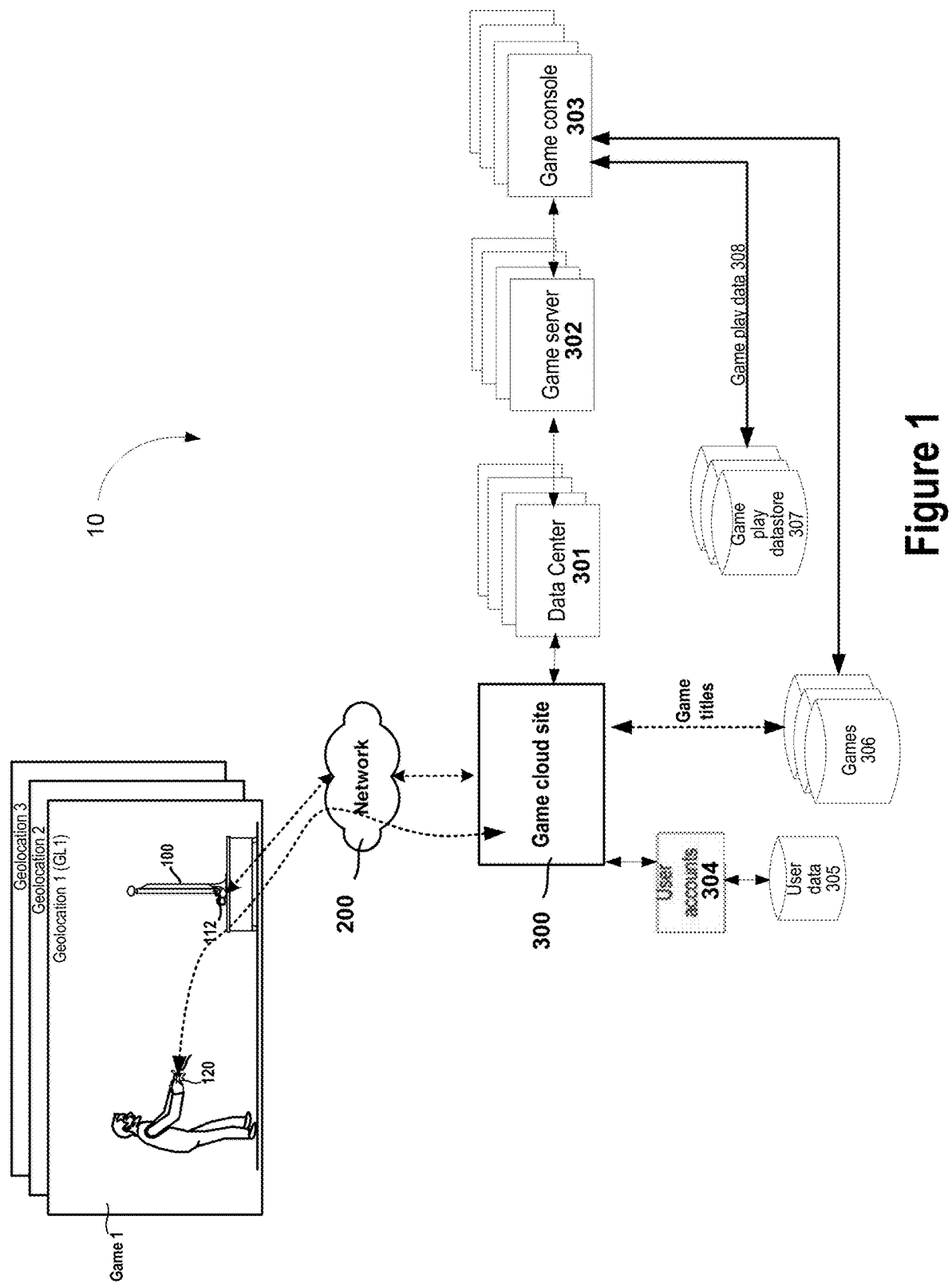
FIG. 1 illustrates a simplified conceptual game cloud system for collecting game inputs from players from different geolocations and adjusting output of a video game that is used for providing recommendation stream to a spectator, in accordance with one implementation of the disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Currently, players select a video game (simply referred to as "game") for game play and provide game inputs. The game logic processes the game inputs to generate game play data. The game play data is used to generate various camera views of each scene of the video game accessed by the players. Streaming capability of the video game enables live streaming of the game play over a network, such as the Internet. Spectators can access the video game through websites, gaming platforms, mobile applications, content provider platforms, or any other application/content platforms and spectate the players' game play. The spectators may wish to follow a particular player's game play or the overall game play of the game. The sophisticated design of the video game allows the video games to generate different camera views for each action occurring in each game scene accessed by the players. For example, the game play data of the video game may be used to generate camera views for each player (i.e., player camera view) playing the video game. The camera view generated for each player may capture a view of a game scene in which a particular action is occurring from the perspective of the player. In one implementation, the particular action may be occurring in response to the player's game inputs. In alternate implementation, the particular action may be occurring in response to other player(s) game inputs or in response to natural progression made in the video game. In addition to player camera views, the video game may also generate spectator camera views for each spectator accessing the video game to spectate the game play, when the spectator wishes to follow the game play of the game. The spectator may provide inputs to specify camera views that they desire to view for each action occurring in each game scene of the video game and the spectator camera views are generated in accordance to the specifics provided in the inputs by the spectator. A view of the game scene captured in each spectator camera view generated for each action of the video game is different from a view captured in the player camera view generated for the same action. The spectators who actively provide inputs during game play to specify camera views that they desire to view are herein referred to as 'active spectators". Consequently, the spectator camera views generated for the active spectators are henceforth referred to as "active spectator camera views" (ASCVs). Alternately, the spectator may wish to follow the overall game play of the game. In this case, the spectator does not actively provide inputs to specify camera views that they want to watch. Instead, the spectator relies on the system to provide the camera views for different actions occurring in the video game. Since, the spectator does not actively provide inputs for selecting camera views, the spectator is referred to herein as a "passive spectator". The game logic is used to select either the player camera view or the active spectator camera view for each action for presenting to the passive spectator. With the sheer number of players playing the MMO video game and number of spectators that spectate the video game, the video game generates a large number of camera views capturing views of different actions occurring in the video game during game play.

Currently, when the passive spectator desires to view the game play of the video game, the passive spectator is provided with all the camera views that are generated for each action occurring in the video game. The passive spectator has to manually go through each camera view for each action in order to select a specific camera view for each action that he would like to view. Given the sheer number of camera views generated for each action, this can be a daunting task. Manually having to through the various camera views is both time consuming and labor intensive, leading to frustration and disinterest in the game play of the game by the passive spectator. Loss of spectators' interest may lead to loss in revenue for game developers, as the interest in the game can often translate into purchase of the game by the spectator or higher revenue from sponsors.

To address such issues, various implementations of the present disclosures provide systems and methods wherein the game play data of the game is collected from a plurality of players from a game play session (e.g., current or prior sessions), various camera views available for each action in a game scene are identified, and a specific camera view that would provide the desired view of the action within the game scene for the passive spectator is intelligently identified. The specific camera view for each action is identified based on the profile of the passive spectator. The profile identifies the viewing preferences of the passive spectator based on the viewing history of the passive spectator collected over time. In some instances, the viewing preferences of the passive spectator may be dynamically adjusted with preference inputs provided by the passive spectator. The various camera views for the video game provided to the passive spectator during the viewing of the video game are used to generate a recommendation stream. The camera views presented to the passive spectator and included in the recommendation stream may include only player camera views selected from the game play of a single player or from a plurality of players, only active spectator camera views generated for the different active spectators, or a combination of both player camera views and active spectator camera views. As noted, the player camera view of a player covers a view of a game scene where an action is occurring from the perspective of the player and the active spectator camera view captures the game scene beyond or different from what is captured in the player camera view. Each of the camera views included in the recommendation stream is in accordance to the profile of the passive spectator and is selected to match one or more viewing preferences of the passive spectator. The selection of the camera views in accordance to the profile of the passive spectator enables the passive spectator to watch the game play in accordance with what the passive spectator wants to view, and the selection of the camera views is done without requiring the passive spectator's input, thereby letting the passive spectator to have an enriching viewing experience.

A view recommendation engine engaging a machine learning algorithm is used to generate a recommendation model with game inputs from the players and game play data generated during game play of the video game. The recommendation model is continually trained with additional game inputs received from the players and additional game play data generated for the video game in response to the additional game inputs. An output from the recommendation model is identified to match with the viewing objectives defined by the viewing preferences included in the profile of the passive spectator. The output from the recommendation model is used to identify the specific camera views for presenting to the passive spectator, which includes the views of game scenes of the game in which an action is occurring. The specific camera views identified from the output of the recommendation model are more relatable to the passive spectator as they have been selected in accordance to the viewing preferences of the passive spectator than the views provided by the video game.

With the general understanding of the inventive embodiments, example details of the various implementations will now be described with reference to the various drawings.

FIG. 1 provides an overview of a game cloud system (GCS) 10 used for accessing games for game play. The GCS 10 includes a plurality of client devices 100 (100-1, 100-2, 100-3, . . . 100-*n*) distributed in a single geolocation or in different geolocations and communicatively connected to a game cloud site 300 over a network 200. The GCS 10 is configured to host a plurality of games and other interactive applications, such as social media applications, content provider applications, etc. The GCS 10 may be accessed from a single geolocation or from a plurality of geolocations. The client devices 100 can be any type of client computing device having a processor, memory, and communication capabilities to access the network 200, such as LAN, wired, wireless or 4G/5G, etc., and may be portable or not portable. The client devices 100 may run an operating system and include network interfaces to access the network 200 or could be thin clients with network interface to communicate with the game cloud site 300 via network 200, wherein the game cloud site 300 provides the computation functions. For example, the client devices can be smartphones, mobile devices, tablet computers, desktop computers, personal computers, wearable devices, connected televisions, or hybrids or other digital devices that include monitors or touch screens with a portable form factor.

The client devices 100 having 5G communication capabilities may include mobile devices or any other computing devices that are capable of connecting to 5G networks. In one implementation, the 5G networks are digital cellular networks, where the service areas are divided into a plurality of "cells" (i.e., small geographical areas). Analog data generated at the mobile devices are digitized and transmitted as radio waves to a local antenna within a cell using frequency channels that can be reused in geographically separated cells. The local antenna is connected to Internet and telephone network by a high bandwidth optical fiber or other similar wireless communication. The 5G networks are capable of transmitting data at higher data rates as they use higher frequency radio waves for communication and, as a result, provide lower network latency.

Players may access a video game available at the GCS 10 using a user account. In response to an access request for a game for game play from a player, the user account of the player is verified against user accounts 304 maintained in a user datastore 305. The request is also verified against a games datastore 306 to determine if the player is eligible to access and play the video game, prior to providing access to the video game. The verification is done by identifying all the game titles available at the game cloud site 300 that the player is eligible to view or play and validating the game title included in the player's request against the identified game titles. The games datastore 306 maintains a list of game titles that are or can be hosted at the GCS 10 and when new games are introduced, the game titles, game code and information related to the new games are updated to the games datastore 306. It should be noted that although the various embodiments are described in relation to a video game (also referred to as "game"), the embodiments can be extended to include any other interactive applications.

After successful verification of the user and the request, the game cloud site 300 identifies a data center where the game can be hosted and sends a signal to the identified data center to load the game associated with the game title identified in the request. In some implementations, more than one data center may be hosting or capable of hosting the game. In these implementations, the game cloud site 300 identifies a data center that is geographically proximal to the geolocation of the player. The geolocation of the player may be determined using Global Position System (GPS) mechanism within the client device 100, the client device's IP address, the client device's ping information, the player's social and other online interactions performed via the client device 100, to name a few. Of course, the aforementioned ways to detect the geolocation of the player is provided as example and it should be noted that other types of mechanisms or tools may be used to determine the geolocation of the player. Identifying the data center proximal to the geolocation player may be to reduce the latency when transmitting game related data between the client device 100 of the player and the game executing at the identified data center 301. The data center 301 may include a plurality of game servers 302 and a game server 302 is selected based on the resources available at the game server 302 for hosting the game. In some implementations, an instance of the game may be executed on one or more game servers 302 within the identified data center 301.

In some implementations, the identified data center 301 may not have the necessary resources (e.g., bandwidth, processing, etc.,) to host the game. In such implementations, the game cloud site 300 may identify a second data center that is geographically proximal to the geolocation of the player and has the necessary resources to host the game.

The game cloud site 300 loads the game to the one or more game servers 302 in the identified data center 301. The one or more game servers 302 include the hardware/software resources to satisfy the requirements of the game. The game server 302 may be any type of server computing device available in the game cloud site 300, including a stand-alone server, etc. Further, the game server 302 may manage one or more virtual machines supporting a game processor that executes an instance of the game for the player, on a host.

In some implementations, the one or more servers 302 may include a plurality of game consoles (or computing devices) 303 and the game cloud site 300 may identify one or more game consoles or computing devices 303 within the identified one or more servers 302 to load the game. Each of the one or more game consoles/computing devices 303 may be an independent game console or computing device, or may be a rack-mounted server or a blade server. The blade server, in turn, may include a plurality of server blades with each blade having required circuitry and resources for instantiating a single instance of the game, for example. Of course, the game console described above is exemplary and should not be considered restrictive. Other types of game consoles or computing devices, including other forms of blade server may also be engaged for executing an instance of the identified game. Once the one or more game consoles or computing devices are identified, the generic game-related code for the game is loaded onto the one or more game consoles/computing devices and made available to the player.

In other implementations, the video game may be executed locally at the client devices 100 and metadata from the executing video game may be transmitted over the network 200 to the game cloud server(s) (simply referred to hereonwards as "game server") 302 at an identified data center 301 of the game cloud site 300 for affecting the game state and for sharing the game play data with other players and spectators.

Game inputs to affect game state of the game may be provided from input devices, such as mouse 112, keyboard (not shown), etc.) or control interface (e.g., touch screen, etc.) associated with the client device 100, or from controller 120 that is communicatively connected to the client device 100. Game play data generated from game inputs of the players during game play of the video game is used to create a recommendation model (i.e., an artificial intelligence (AI) model). The recommendation model is further trained using additional game play data generated with ongoing game inputs provided by the players during the game session. The trained recommendation model is used to identify camera views provided to each player. The camera views provided to each player capture a view of game scenes in the video game in which one or more actions are occurring during game play, and these camera views are designed to capture the game scene from the perspective of each player. Hence, the camera views provided to each player are also referred to herein as "player camera views". The trained recommendation model is also used to identify camera views provided to different active spectators that satisfy each spectators viewing objectives. The active spectators are those spectators that have accessed the video game for viewing game play and are actively providing inputs to identify different views of the game scene associated with each action of the video game that they would like to view. Based on the inputs from the active spectators, the video game is re-executed to generate the specified camera views for the active spectators. The camera views generated for the active spectators are henceforth also referred to as "active spectator camera views" and capture views of game scenes capturing actions from a viewing angle, or viewing depth, or viewing direction that is different from what was captured in the camera view provided to each player.

In some instances, a spectator other than an active spectator may access the video game for viewing. The spectator, in this case, selects the video game for viewing but is not providing any other inputs to select the specific camera view. After selecting the video game, the spectator sits back to view the camera views capturing different stages of game play of the video game. The spectator in this case, is referred to herein onward as a "passive spectator," as he is not providing any input to influence generation of a camera view but instead is relying on the system to provide him with the camera views capturing different actions in the video game. A view recommendation engine executing at the game cloud site 300 is used to identify and provide the specific camera views to the passive spectator. The view recommendation engine uses a recommendation model to identify specific ones of camera views of the video game for returning to the passive spectator. The camera views capturing different actions in the video game are identified in accordance to the profile of the passive spectator. Each camera view identified for the passive spectator captures a view of a game scene where an action is occurring and is presented for duration of the action before being dynamically switched with another camera view capturing the next action occurring in the video game. Thus, during the course of viewing the game play of the video game, the passive spectator may be presented with one or more player camera views and/or one or more active spectator camera views.

The game executing at the game cloud site 300 may be a single player game or a multi-player game. In some implementations, the video game may be a massive multiplayer online (MMO) game that allows a plurality of players from across different geolocations to access and play the video game. Consequently, the player camera views presented to the passive spectator may include player camera views of a single player or of a plurality of players. Similarly, the active spectator camera views presented to the passive spectator may include active spectator camera views of a single active spectator or of a plurality of active spectators. The different camera views provided to passive spectator is in accordance to the viewing preferences determined from the user profile of the passive spectator. The camera views thus allow the passive spectator to view the different actions in accordance to what the spectator desires to see, thereby enriching the spectator's game viewing experience. Frames of the specific ones of the camera views identified for the passive spectator are forwarded to a game engine for processing, encoding and streaming to the client device of the passive spectator, where the streams are decoded and rendered.

The game engine (not shown) may include a multi-player distributed game engine that is communicatively connected to game logic of the game. Generally speaking, a game engine is a software layer that serves as a foundation for a game, such as MMO game, and provides a framework that is used to develop the video game. The game engine abstracts the details of doing common related tasks (i.e., game engine tasks) required for every game, while the game developers provide game logic that provides the details of how the game is to be played. The game engine framework includes a plurality of reusable components for processing several functional portions (i.e., core features) for the game that bring the video game to life. The basic core features that are processed by the game engine may include physics (e.g., collision detection, collision response, trajectory, movement of object based on gravity, friction, etc.), graphics, audio, artificial intelligence, scripting, animation, networking, streaming, optimization, memory management, threading, localization support, and much more. The reusable components include process engines that are used to process the core features identified for the game.

During game play of the game, the game engine manages the game logic of the game, collects and transmits one or more players inputs received from one or more client devices 100, to the game logic. The game engine further manages the allocation and synchronization of the functional portions of the game engine to process game data generated by the game logic, in an optimal manner, and generates frames of game data that is transmitted back to the client devices 100 for rendering. A variety of game engines are currently available to provide different core functionalities and an appropriate game engine may be selected based on the functionalities specified for executing the video game. Recommendation stream generated by the view recommendation engine is processed by the game engine, encoded and streamed to the client device of the spectator, in response to the request for viewing a game scene of the game.

The game inputs provided by the player during game play correspond to the activities performed by the player in the video game. For example, the activities performed by the player may cause certain actions to be performed in the game scene of the video game. The game inputs of the player, the activities performed, and the actions occurring in the video game are part of telemetry data that is used to generate game play data 308. The game play data 308 and the telemetry data are stored in game play datastore 307. The game inputs provided by the player are processed by the game logic to affect game state of the video game. The game state of the video game identifies overall state of the video game at a particular point and is influenced by intricacies of the effect of game inputs of the player on the game play of the video game. If the video game is a MMO game, then inputs from a plurality of players are used to influence the overall game state of the video game. The game play data generated for the game play includes saved data of each player. The saved data of a player includes any game customization provided by the player for the video game. The telemetry data captures characteristics of each activity that a player attempted, the player accomplished, the player failed, etc., player attributes of the player, game customizations of the player, game features, to name a few. The player attributes may be updated to the player profile stored in the user datastore 305. The game play data also includes image data related to game scenes accessed during the game play. The image data is used to generate various camera views provided to the player, the active spectators and the passive spectators.

FIG. 2A illustrates various camera views that can be generated for the game during game play, in one example implementation. A plurality of players are shown to have accessed the game cloud site 300 and selected video game, game 1, for game play. Game inputs provided by each player are used to generate game play data. The game play data is processed to generate frames of player camera views forwarded to the respective player. One or more active spectators may select to follow the game play of one or more players. These active spectators provide inputs that are used to identify specific camera views that capture each action occurring in the video game. FIG. 2A shows players P1-P6 currently playing game 1. Each player may be progressing at different pace within game 1. Each player is provided with a respective player camera view of a game scene of the game where an action is occurring. The action may occur in response to game inputs provided by one or more players or based on the game logic of the video game. The player camera view (PCV) provided to each player shows the game scene of the game from the player's perspective. Thus, player P1 is presented with player camera view PCV1 showing the game scene of game 1 from player P1's perspective, player P2 is presented with player camera view PCV2, player P3 with player camera view PCV3, and so on. Game inputs provided by each player are transmitted to the game cloud site 300 via network 200. The game logic of game 1 executing on the game cloud site 300 uses the inputs of each player to affect the game state of game 1 and to generate the game play data. Game play data resulting from the inputs of each player is processed to generate frames of images that are returned to the respective player as player camera view. The player camera view of each player illustrates a current game state of game 1.

One or more active spectators have also signed into the game cloud site 300 to view game play of the one or more players. For example, spectators S1 and S2 may have chosen to view game play of player P1, spectator S3 may have chosen to view game play of player P3, and spectator S4 may have chosen to view game play of player P5. Each active spectator actively provides inputs, during game play, to specify a specific camera view that the active spectator would like captured for an action occurring in the video game, and for which corresponding one or more player camera views were generated. The game logic uses the game play data that corresponds with a time of occurrence of the action and re-executes the video game to generate the active spectator camera view for the active spectator in accordance with the specifics included in the inputs. The inputs from the active spectator may identify a specific direction, depth, angle, clarity, etc., that they would like captured in the game scene associated with the respective action, and the active spectator camera view is generated accordingly. The active spectator camera view generated for each action for each active spectator captures a view of game scene that is different from the view captured in the corresponding player camera view(s) generated for the same action. For example, based on the inputs of active spectator AS1, an active spectator camera view ASCV1.1 (i.e., active spectator camera view 1 of player 1's game scene) is generated for the game scene captured in the player camera view PCV1 of player 1. Similarly, based on the inputs of active spectator AS2, an active spectator camera view ASCV1.2 (i.e., active spectator camera view 2 of player 1's game scene) is generated for the game scene captured in PCV1 of player 1. Along similar lines, based on inputs provided by active spectator AS3, an active spectator camera view ASCV3.3 is generated for the game scene captured in PCV3 of player 3, based on inputs of spectator AS4, active spectator camera view ASCV5.4 is generated for the game scene captured in PCV5 of player 5, and so on. Each active spectator camera view generated from inputs of the active spectators may be distinct and may identify a different angle, depth, direction, clarity, etc., of capture of the same game scene that a player is viewing. The active spectator camera views generated may show fewer or additional features of the game scene.

FIG. 2B illustrates an expanded view of the various camera views of a game scene of game 1 in which an action is occurring. The action may be in response to game inputs from the player P1 or based on game logic of the video game. Player P1 is presented with player camera view PCV1 that captures a view of a game object 101 within a game scene. Two active spectator camera views have been generated for this game scene based on inputs provided by the active spectators S1 and S2. Thus, active spectator camera view ASCV1.1 generated in response to the inputs of active spectator S1 shows a camera view of the game scene captured in PCV1 of player P1 but from a different view angle. Accordingly, ASCV1.1 includes the game object 101 that was included in PCV1 as well as a view of a first game object 102 that was outside of the player camera view PCV1. This is because, the active spectator camera view ASCV1.1 was captured from beyond PCV1, as shown in FIG. 2B. Similarly, active spectator camera view ASCV1.2 generated from inputs of active spectator S2 captures a different perspective of the game scene captured in PCV1 and includes a view of a second game object 103 in addition to game object 101 captured in PCV1. The active spectator camera view ASCV1.2 is capturing the game object 101 from a different angle than what was captured in PCV1 and ASCV1.1. The active spectator camera views generated from inputs of the different active spectators may capture the game object 101 from different angles than what was captured in the PCV. For example, one active spectator camera view (not shown) may capture an overhead camera view of the game object 101 while another ASCV may show a view from an opposite side of the game object 101 shown in PCV1. The game logic is configured to generate the various views of each game scene of the game play where action is occurring, based on inputs from the different active spectators so as to capture the different features of the game play.

When a passive spectator selects the video game for viewing, a view recommendation engine executing at the game cloud site 300 is configured to extract the different camera views generated for each action occurring in each game scene and select specific one of the camera views to present to the passive spectator for that action. The specific one of the camera views is selected based on the viewing preferences of the passive spectator specified in the passive spectator's user profile. The passive spectator just selects the video game for viewing and the view recommendation engine performs the work of going through the different camera views generated for each action and identifies the appropriate camera view for the passive spectator. Each camera view presented to the passive spectator corresponds to an action occurring in the game scene. The camera view presented for each action lasts for the duration of the action captured within and is one of a player camera view or an active spectator camera view generated for the action.

The view recommendation engine dynamically switches between the player camera view and the active spectator camera view and the dynamic switching is based on the context of the action occurring in the respective camera views. For example, the video game may be a car racing game and the camera views are capturing different views of the race. A player camera view PCV1 of player 1 is capturing a game scene of the race from player 1's perspective—the player 1's car is shown to be ahead of the competitors with no cars in front. An active spectator camera view of spectator S1 is capturing the same game scene and includes a second car associated with a second player that is coming from behind and is trying to overtake the player 1's car on the race track. The view recommendation engine evaluates the two camera views and determines that the active spectator camera view ASCV1.1 of AS1 is capturing more interesting action (i.e., relative position of second car with respect to player 1's car in the race) in the game scene than the game scene captured in the PCV1. As a result, the view recommendation engine may select ASCV1.1 of AS1 to present to the passive spectator instead of PCV1.

In one implementation, in addition to identifying specific camera views based on context of the actions occurring within the respective camera views, the view recommendation engine may further filter the camera views in accordance to the profile of the passive spectator. The profile of the passive spectator may specify that the passive spectator is interested in viewing exciting actions, or selecting overhead view of the game scene, or selecting a particular player or active spectator to follow, etc., and the view recommendation engine would identify the camera view in accordance to the profile of the passive spectator. In the above example, if the passive spectator was interested in following player P1, then the view recommendation engine may identify PCV1 instead of ASCV1.1 to present to the passive spectator. The passive spectator just sits back to enjoy the select camera views identified in accordance to his viewing preference. As the game play continues, the view recommendation engine dynamically switches between the PCVs of different players and ASCVs of different active spectators, and such switching correlates with a time of the different actions occurring in the video game.

FIGS. 3A and 3B illustrate the different perspective of game play data flow within the game cloud site 300 for identifying camera views to a passive spectator. The camera views capturing the different actions are streamed to the passive spectator and the streaming of each camera view correlates with the occurrence of different actions within the video game. The camera views are part of a recommendation stream provided to the passive spectator.

FIG. 3A illustrates game play data flow used to generate various camera views for a video game, in one implementation and FIG. 3B illustrates data flow for identifying and providing specific ones of camera views generated in FIG. 3A, to a passive spectator. The various camera views are part of the recommendation stream provided to the passive spectator.

Referring to FIG. 3A, a plurality of players access the game cloud site 300 over a network 200, such as the Internet, and request to play a video game (e.g., game 1), in one implementation. The request may include game identifier of game 1. The game may be a multi-player game played by a plurality of players who are either co-located or remotely located. The requests from the players are received and validated by the game cloud site 300 and after successful validation of each of the players, one or more instances of the game is executed on one or more game consoles 303/ game servers 302 within one or more data centers 301. Game inputs provided by the plurality of players during game play are processed by the game logic of game 1 and are used to update game state of game 1 and to generate game play data 308. The game state of game 1 resulting from the game inputs of the players is synchronized across the instances of the game executing in the one or more data centers 301. In some implementations, each player that is playing the game may be part of a team that competes with other teams within the game. Alternately, each player may be playing independent of another player and encountering different players in different game scenes of the game as they are progressing within the game. In addition to game inputs provided by the players, the active spectators may provide their own inputs to select a particular camera view they would like to view for each action occurring in game 1. The inputs of the active spectators do not change the game state of game 1. The inputs of the active spectators are processed by the game logic of game 1 to update the game play data 308 of game 1. The game play data 308 includes information that is used to generate different camera views for each action occurring in each game scene of game 1. For instance, the game play data 308 is used to generate a plurality of PCVs 430*a* and a plurality of active spectator camera views (ASCVs) 430*b*. Each PCV 430*a* is generated for a specific player and is in response to game inputs provided by the respective player. The identified PCV for each player is forwarded to the respective client device of the player for rendering. Based on the PCV rendered, each player may provide additional game inputs, which is processed by the game cloud site to generate additional game play data. The additional game play data is used by the view recommendation engine 400 to train the recommendation model. As more game play data is provided to the recommendation model, the output of the recommendation model is finely tuned. The fine tuning is used to identify better camera view recommendations to the passive spectator, when game play data is requested by the passive spectator. Similarly, each ASCV 430*b* is generated for a specific active spectator based on the inputs provided by the respective active spectator. The ASCVs 430*b* are returned to the respective active spectators during game play to allow the active spectators to view the game scene where actions are occurring in accordance to their specified view preferences defined in their inputs.

Referring now to FIG. 3B, a passive spectator PS1 interested in viewing the game play of game 1, accesses game 1 executing on the game cloud site 300 via network 200. The game cloud site 300 identifies the passive spectator using the passive spectator's sign-on credentials and extracts the profile 309 of passive spectator PS1. The profile 309 of the passive spectator is provided as input to a view recommendation engine 400. The profile 309 of the passive spectator includes the viewing preferences of the passive spectator collected over a period of time. The view recommendation engine also receives the various camera views generated from game play data 308 of game 1. The view recommendation engine 400 engages machine learning algorithm 410 to generate a recommendation model, which is an artificial intelligence model, using the information related to the camera views generated from the game play data as input. The recommendation model is further trained using the game play data collected from the ongoing game play session to generate different outputs that match different viewing objectives specified by active spectators. An output from the recommendation model is identified for presenting to the passive spectator. The output from the recommendation model is used to select specific one of the camera views for each action occurring in the video game. The camera views are selected based on context of the action occurring in each camera view at a time each action is occurring in the game scene of the video game. The camera views identified may be a player camera view or an active spectator camera view.

When more than one camera view is identified based on the context of the action, the view recommendation engine 400 uses the viewing preferences defined in the profile of the passive spectator PS1 to further filter the camera views. For example, two or more of the active spectator camera views may capture view of an action occurring in the video game. In this example, the view recommendation engine 400 uses the viewing preferences of the passive spectator PS1 to select one of the active spectator camera views for presenting to the passive spectator PS1. The viewing preferences in the profile specify the viewing objectives of the passive spectator and are identified based on viewing history of the passive spectator PS1 collected over time, wherein the viewing history may relate to game 1 and/or other games/ interactive applications. The selected camera view capturing view of an action occurring in the game scene of the video game, is streamed to the passive spectator PS1. The various camera views provided to the passive spectator PS1 over a course of game play of the video game define a recommendation stream 430. The recommendation stream of the passive spectator PS1 is specific for the passive spectator. As such, different passive spectators may be provided different camera views in their recommendation stream and the camera views for the different passive spectators are in accordance to context of the actions occurring within and the viewing preferences of the respective passive spectators.

The camera views identified in the recommendation stream 430 for passive spectator PS1 are then forwarded by the view recommendation engine 400 to a client device 100 of the passive spectator for rendering. The view recommendation engine 400 is thus able to analyze the camera views of the game to identify specific ones of the camera views of game scenes of the game that are more meaningful to the passive spectator, so as to enrich the game viewing experience of the passive spectator.

The request from the passive spectator PS1 may be for viewing game play of a current live streaming game or a pre-recorded game play of a game played by a plurality of players. For simplicity sake, the various implementations are discussed for current, live streaming game play session of a game but can be extended to pre-recorded game play sessions as well. Additionally, the various implementations can not only be applied to MMO games but can also be applied to content generated in a real-world environment that is either live streamed or pre-recorded for later streaming, and for live directing of film making, etc.

The details of the camera views identified for the passive spectator PS1 are forwarded to a stream recommendation engine (or simply referred to as "recommendation engine") 420. The recommendation engine 420 uses the selected camera view for each action in each game scene of the game to generate the recommendation stream 430. The generated recommendation stream 430 is an aggregate of the select camera views of different actions in different game scenes of the game. The camera views identified in the recommendation stream 430 is forwarded to the client device of the passive spectator PS1 via network 200, for rendering. The camera views forwarded to the passive spectator PS1 may be a combination of player camera views of one or more players and/or one or more active spectator camera views capturing different views of different actions. Providing select ones of the camera views that capture game scenes where actions are occurring based on the context of the actions and, where appropriate, in accordance to the passive spectator PS1's viewing preferences allows the passive spectator to be more engaged in the game, thereby enhancing the passive spectator's interest in the game.

Figure 4:
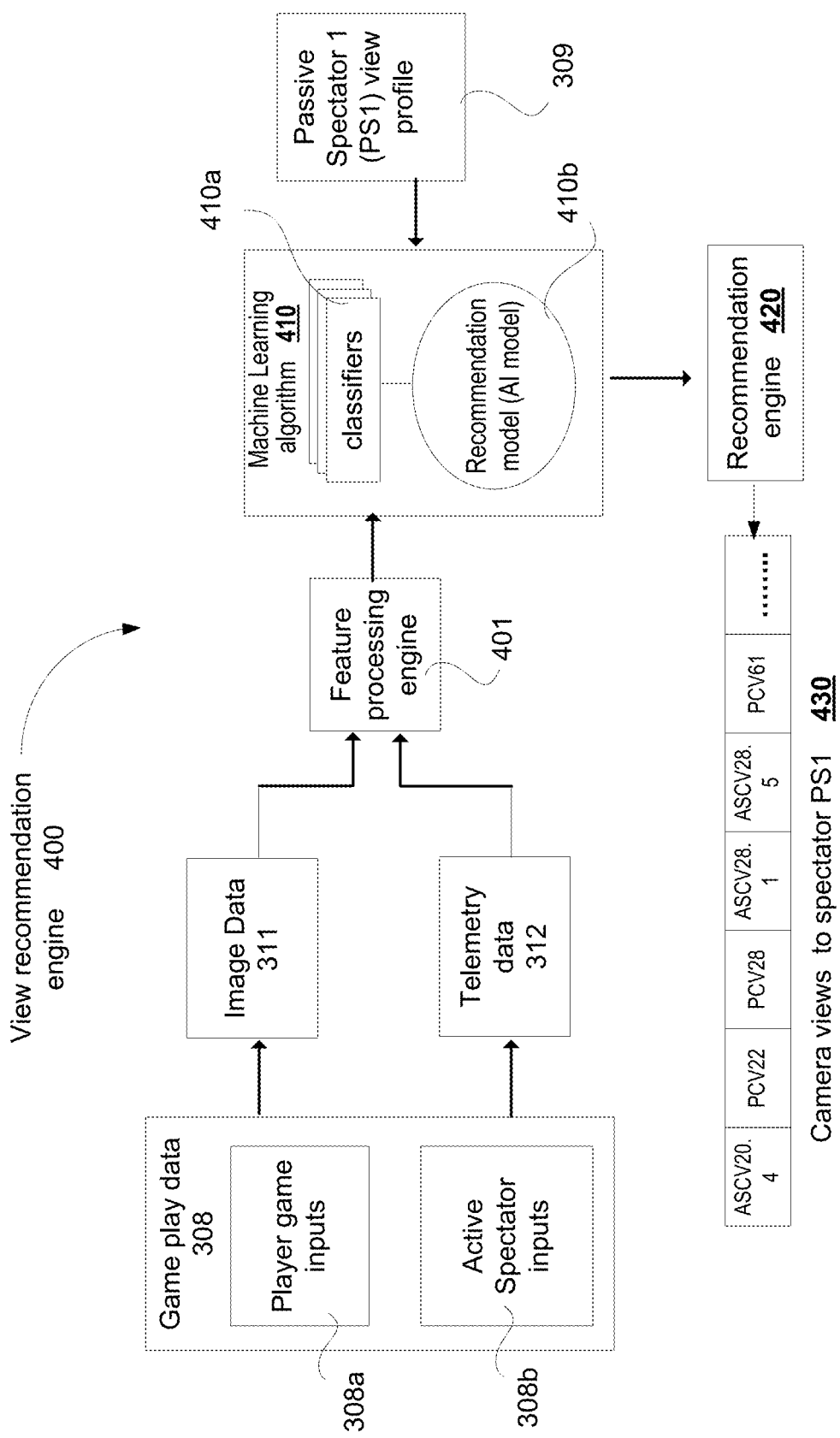
FIG. 4 illustrates a simplified conceptual block diagram of a view recommendation engine used to generate the different camera views that constitute a recommendation stream provided to a passive spectator, in accordance with one implementation of the present disclosure.

FIG. 4 illustrates details of the view recommendation engine 400 that is used to process the game play data 308 generated during game play of a game, in one implementation. As mentioned previously, the game may be a multi-player game played by a plurality of players. Game inputs provided by a plurality of players of the game are used to update a game state of the game and to generate the game play data 308. The game play data 308 is used to generate different game camera views that are part of a recommendation stream 430 identified for passive spectator for the game. The game play data includes game inputs 308a of each player. The game inputs 308a of each of the players are used to affect an outcome of the game. In addition to the game inputs 308a provided by the players, one or more active spectators may provide inputs 308b during game play to influence generation of active spectator camera views (ASCVs) 430b. In response to the inputs 308b from the active spectators, the game logic re-executes the game using the game play data 308 available at the time the inputs 308b are received from the active spectators to generate ASCVs 430b for the actions occurring in game scenes. The different PCVs 430a captured for each action occurring in the game scene capture the different players' perspectives of the action while the ASCVs 430b generated for each action capture different views and aspects than what is captured in the corresponding PCVs 430a. The views of each action in the game scene captured by the ASCVs 430b together with the PCVs 430a include sufficient data to enable construction of a three dimensional representation of the game scene associated with the action.

To identify the camera views that are part of a recommendation stream 430 returned to passive spectator for game 1, the game play data 308 is processed to extract image data 311 and telemetry data 312. The image data 311 provides details of various image features included in each game scene accessed by one or more players in the video game. The telemetry data 312 captures details of the game play including game inputs provided by the player, characteristics of each activity that a player attempted, the player accomplished, the player failed, etc., player attributes of the player, effects of game inputs of the player on the game state, game features of the game including type, game play level, complexity level, etc. The image data 311 and the telemetry data 312 are forwarded to a feature processing engine 401 for further processing. The image data 311 may be stored in image datastore 311a and the telemetry data 312 may be stored in a telemetry datastore 312a.

The feature processing engine 401 extracts the image data 311 from the image datastore 311a and processes the image data 311 to extract various features of the images captured in each camera view of game play data. The image features of a game scene may include features of each game object (e.g., length, width, height, size, weight, color, static or kinetic characteristics, etc.,) included in the game scene, such as number and location of each game object, number, location and feature of non-playing characters, number, location and features of player's adversaries or collaborators, etc. Further, the image features may also include the angle of capture, the depth of capture, the clarity of the image captured, etc. The feature processing engine 401 also extracts the telemetry data 312 from the telemetry datastore 312a and processes the telemetry data 312 to extract features of game play and attributes of players providing the game inputs that affect the game play. The game play details included in the telemetry data 312 can be used to identify the intricacies of the various game inputs provided by the player and the outcome of the game inputs within the game scene captured in each camera view.

Image features, game features, and the player attributes extracted from the game play data 308 during game play of the game are provided as inputs to the machine learning algorithm 410. The machine learning algorithm includes classifiers 410a defined for different features and attributes extracted from the game play data of the game. The classifiers 410a are used to generate a recommendation model 410b. The recommendation model 410b is trained using the game inputs, additional game inputs received from the players during the game play of the video game collected over time. In one implementation, the game inputs are collected from a plurality of game play sessions. The training of the recommendation model is to fine-tune the attributes, features included in the various nodes of the recommendation model and to strengthen the relationship defined by the edges between pairs of consecutive nodes of the recommendation model. Various outputs are defined in the recommendation model, wherein each output relates to specific game behavior of the players and/or viewing preferences of the active spectators. An output from the recommendation model 410b is selected based on the context of actions occurring in each of the various camera views capturing the respective actions. The selected output identifies the camera views to be provided to the passive spectator, in response to the viewing request from the passive spectator. In addition to the context of the actions used to select specific ones of the camera views, viewing preferences of the passive spectator may also be used to identify an output from the recommendation model. The viewing preferences of the passive spectator may be obtained from profile 309 of the passive spectator, which may register the type of game, the type of actions, the type of views, etc., the passive spectator liked and this information can be obtained from viewing history of the passive spectator gathered over a period of time. The camera views are identified and returned to the passive spectator to satisfy the viewing preferences of the passive spectator.

In some implementation, more than one camera view capturing a view of the action in accordance to the context of the action and the viewing preferences of the passive spectator, may be identified. In such implementations, the viewing preferences of the passive spectator is weighted and the camera views are further filtered based on the weighted preferences in order to identify a specific one of the camera views that best match the weighted preferences of the passive spectator. The specific one of the camera views is recommended to the passive spectator. The camera views recommended to the passive spectator are in accordance to the actions occurring in the game scene and in, some instances, in accordance to the viewing preferences of the passive spectator so as to allow the passive spectator to have optimal viewing experience. The output from the recommendation model 410b is provided to the recommendation engine 420, which identifies select one of the camera views for each action. The camera view selected for an action occurring in the game scene is provided for a duration of the action and upon completion of the action, the camera view is dynamically switched to a different camera view that corresponds with action occurring at the time of dynamic switching. The camera views streamed to the passive spectator for different actions define a recommendation stream 430 of content of the game play. The recommendation stream 430 includes one or more PCVs 430a and one or more ASCVs 430b. The sequence of the camera views in the recommendation stream matches the sequence of occurrence of the various actions in the game play of the video game. In one implementation, the recommendation stream 430 generated by the recommendation engine 420 may be specific for each passive spectator as it may include one or more camera views that are in accordance to the respective passive spectator's viewing preferences. The recommendation stream 430 of each passive spectator is returned to respective client device 100 of the spectator for rendering, in response to the request from the passive spectator.

Figure 5:
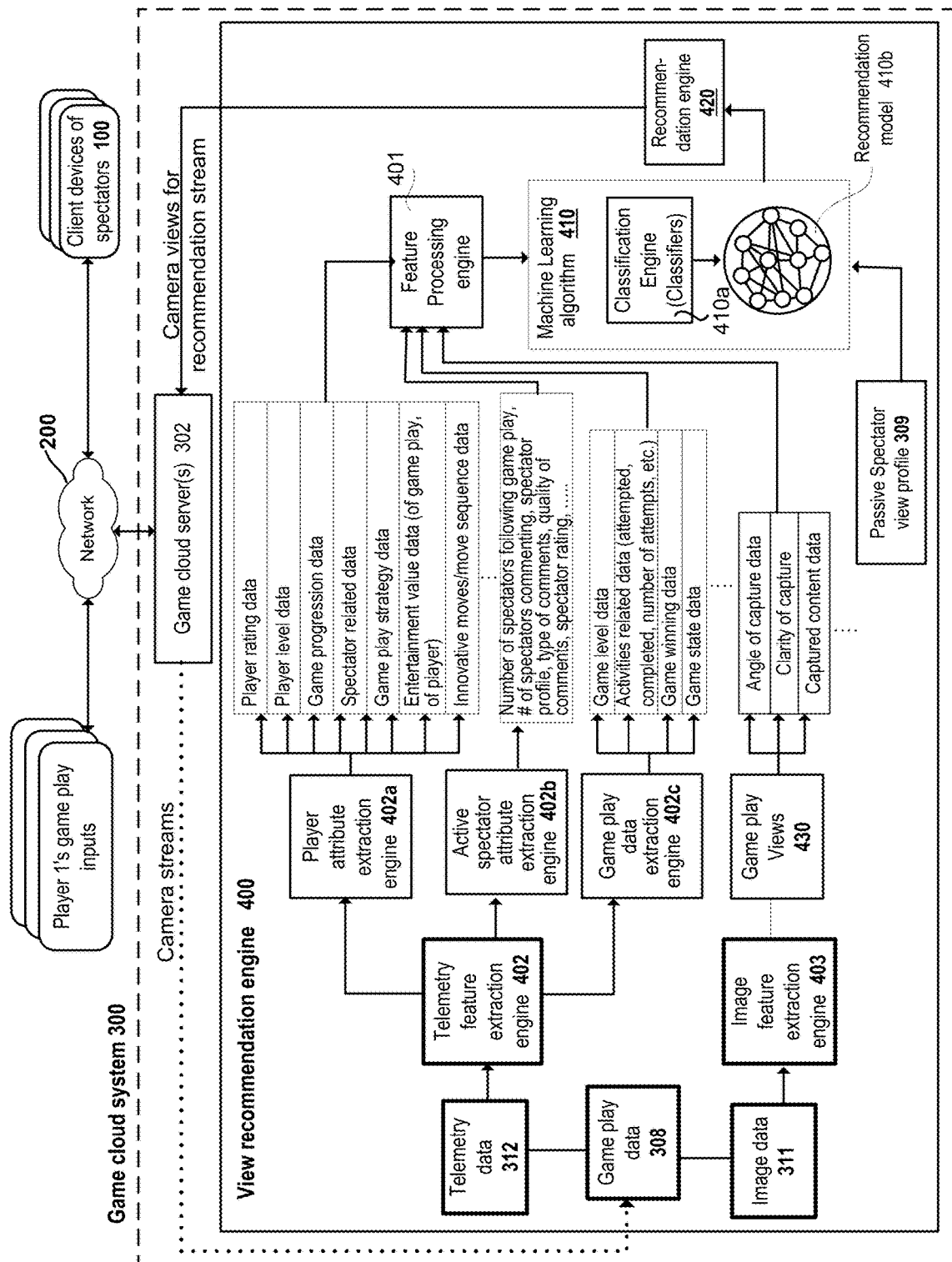
FIG. 5 illustrates a simplified block diagram of different modules within a view recommendation engine used to generate recommendation stream for a spectator, in accordance with one implementation of the present disclosure.

FIG. 5 illustrates the various modules of a view recommendation engine 400 used in processing the game play data of the game to generate recommendation streams for each passive spectator that has requested the game play data for the game, in one implementation. The view recommendation engine 400 includes a plurality of modules/process engines to process the game play data and to identify various features and attributes included in the game play data. The modules included in the view recommendation engine 400 may include a telemetry feature extraction engine 402, an image feature extraction engine 403, a player attribute extraction engine 402a, a spectator attribute extraction engine 402b, and a game play data extraction engine 402c. In addition to the aforementioned modules/engines, the view recommendation engine 400 may also include a feature processing engine 401, a machine learning algorithm 410 including classifiers (i.e., classification engine) 410a, a recommendation model 410b, and a recommendation engine 420, to name a few.

The game inputs generated at respective client devices of players during game play of a game are forwarded to the one or more game servers 302 executing instances of the game, for further processing. The game logic of the game uses the game inputs to update the game state of the game and generate game play data 308. The game play data 308 is used to generate a plurality of camera views that are part of a recommendation stream 430 returned to the passive spectator The plurality of camera views capture different perspectives of actions occurring in different game scenes of the game. The camera views generated from the game play data 308 include player camera views (PCVs) capturing the respective player's perspective of each action occurring in each game scene of the game. In addition to the PCVs, inputs provided by active spectators are used to generate a plurality of active spectator camera views (ASCVs). The inputs from the active spectators specify a depth, a direction, clarity level, angle, content that the active spectator would like to be captured for each action. The game logic uses the inputs of the active spectators to re-execute the video game to generate active spectator camera views (ASCVs) for each action. The PCVs 430a and ASCVs 430b along with the game play data 308 are forwarded to a view recommendation engine 400 that is executing at a game server 302. The game server 302 executing the view recommendation engine 400 may be the same game server 302 that is executing an instance of the game accessed by one or more players and/or spectators, or may be a different game server 302 that is communicatively connected to the one or more game servers 302 executing the game. The players may participate in game play of the game by accessing a single instance of the game executing at the game server 302. Alternately, the players may access different instances of the game executing at different game servers 302. In such cases, the game state of the game is synchronized across all executing instances of the game, so that the players may be presented with current game state of the game.

The communication connection enables the view recommendation engine 400 to receive the game play data 308 along with the generated game camera views as camera streams. The game play data 308 captures the telemetry data 312 and the game camera views capture image data 311 of the game play of the plurality of players. The telemetry data 312 captures the intricacies of the actions performed in the game based on the game inputs from the players.

The telemetry feature extraction engine 402 is configured to process the telemetry data 312 contained in the game camera views. The telemetry data 312 includes player attributes defined based on each player's game inputs and game playing skills, and game features resulting from the execution of the game. The telemetry feature extraction engine 402 includes a player attribute extraction engine 402a, a spectator attribute extraction engine 402b, and a game play data extraction engine 402c. The player attribute extraction engine 402a is configured to extract player related data from the telemetry data 312. Some of the player related data that may be extracted include data related to player rating, player level, game progression, game play strategy adapted by each player, entertainment value pertaining to game play and pertaining to player, move sequences of player, unique moves performed by the player, etc. The player rating data of each player may be updated from rating inputs provided by other players, active spectators, content providers, etc. The player related data is used to determine the player attributes (e.g., popularity, skill/expertise level, etc.,) of each player providing the game inputs in the game. The player related data may be stored in the user datastore 305 and may be used to update the player's profile included in the user accounts 304.

The game play data extraction engine 402c is configured to extract data related to game features, such as game level data, data related to activities performed by the players including activities attempted, activities completed, number of times each activity was attempted, game winning data of each player, game state data, etc. The activities performed by the game inputs of the players may be related to actions performed in the game scene of the game. The game related features are used to determine the game state, saved data pertaining to each player including game customizations performed by each player, etc. The game related features may be stored in the game play datastore 307.

The spectator attribute extraction engine 402b is configured to extract active spectator related data from the telemetry data 312. Some of the active spectator related data that may be extracted include number of active spectators following game play of the game, number of active spectators following each player, profile of active spectators including spectator rating and inputs provided by active spectators. The inputs provided by active spectators may include camera view related inputs, such as specific angle, depth, direction, etc., for capturing game action occurring in game scene of the game. In addition to the aforementioned inputs, the active spectators may also provide other game related inputs, such as comments, ratings, chats, emails, blogs, etc., related to the game play of one or more players. The game related inputs may be used to identify type of comments provided, quality of comments, spectator knowledge of the game, etc. The active spectator related data may be updated to the profile of the spectator and may also be used to update the game features and/or the player attributes of each player (e.g., popularity, skill level, etc.,) providing the game inputs to the game. The active spectator related data may be stored in the user datastore 305 separate from or alongside the player attributes.

The image feature extraction engine 403 is similarly configured to extract various image features from the image data 311. The image features extracted from the image data 311 can be used to segregate the PCVs 430*a* from ASCVs 430*b* within the game play views. The image features that are extracted may include data related to angle of capture, depth of capture, direction of capture, clarity of the images captured in each capture view, content captured in the images, game objects that are targeted by game inputs from players, location and features of game objects that are targeted by the game inputs, etc. Data related to images may be stored in image datastore 311*a*.

The player attributes extracted by the player attribute extraction engine 402*a*, active spectator attributes extracted by the spectator attribute extraction engine 402*b*, game features extracted by the game play data extraction engine 402*c*, and the image features extracted by the image feature extraction engine 403 are provided as inputs to the feature processing engine 401 for further processing. The feature processing engine 401 identifies the intricacies of game play, and correlates the features, attributes identified in various camera views generated from the game play data to specific actions occurring in each game scene of the game. The processed features, attributes, actions, game scenes and other game related data from the feature processing engine 401 are provided as inputs to the machine learning algorithm 410. The machine learning algorithm 410 includes classifiers 410*a* that are defined using one or more image features, game features, player and/or active spectator attributes. Information included in the classifiers 410*a* is used to generate the recommendation model 410*b*. The recommendation model 410*b* is an AI model that is built and trained using the various features and attributes extracted from the game play data 308. The recommendation model 410*b* includes a plurality of nodes and edges. Feature, attribute information defined in the various classifiers is used to populate the various nodes of the recommendation model 410*b* and the edge between any pair of consecutive nodes is used to define the inter-relationship between the information contained in the respective nodes. As additional game data is generated from the game play of the game, the AI model is trained with the additional game data. The additional game data is used to fine tune the features, attributes included in the respective nodes and the corresponding edges defining the inter-relationship between the respective nodes, making the inter-relationship stronger. The machine learning algorithm 410 identifies the various camera views for presenting to a passive spectator that is interested in viewing the game play of the game. The various camera views that are identified may include one or more of player camera views or active spectator camera views, and the camera views selected for the passive spectator are based on context of actions occurring in the related player camera views and the active spectator camera views.

The machine learning algorithm 410 also receives profile of passive spectators 309 that are interested in viewing the game play of the game. The profile of passive spectators 309 identify viewing preferences of the passive spectators obtained from viewing history of the passive spectators. These viewing preferences define the viewing objectives of the passive spectators. The machine learning algorithm 410 may, in some implementations, also use the viewing preferences of the passive spectators to identify an output of the AI model that best match the viewing objectives of the passive spectator. Output from the AI model is used to identify various camera views that match the preferences of the spectator, which is in addition to identifying camera views that are based on context of the actions captured in the respective camera views. The recommendation model may identify different outputs for different passive spectators, wherein each output identifies a set of camera views of a game scene of a game capturing a view of an action occurring in the game. The set of camera views are filtered further so as to identify specific ones of camera views that match a particular passive spectator's preferences. The output from the AI model is provided to the recommendation engine 420 as inputs. The recommendation engine 420 uses the output from the AI model to extract data related to select ones of the camera views, process the data to generate frames of game scene content and stream the frames of game scene to a client device 100 associated with each passive spectator, via the network 200 for rendering. The camera views provided to the passive spectator are part of a recommendation stream that is streamed to the passive spectator during the course of game play of the game and provides views of actions that are in line with what the passive spectator wishes to view.

Figure 6:
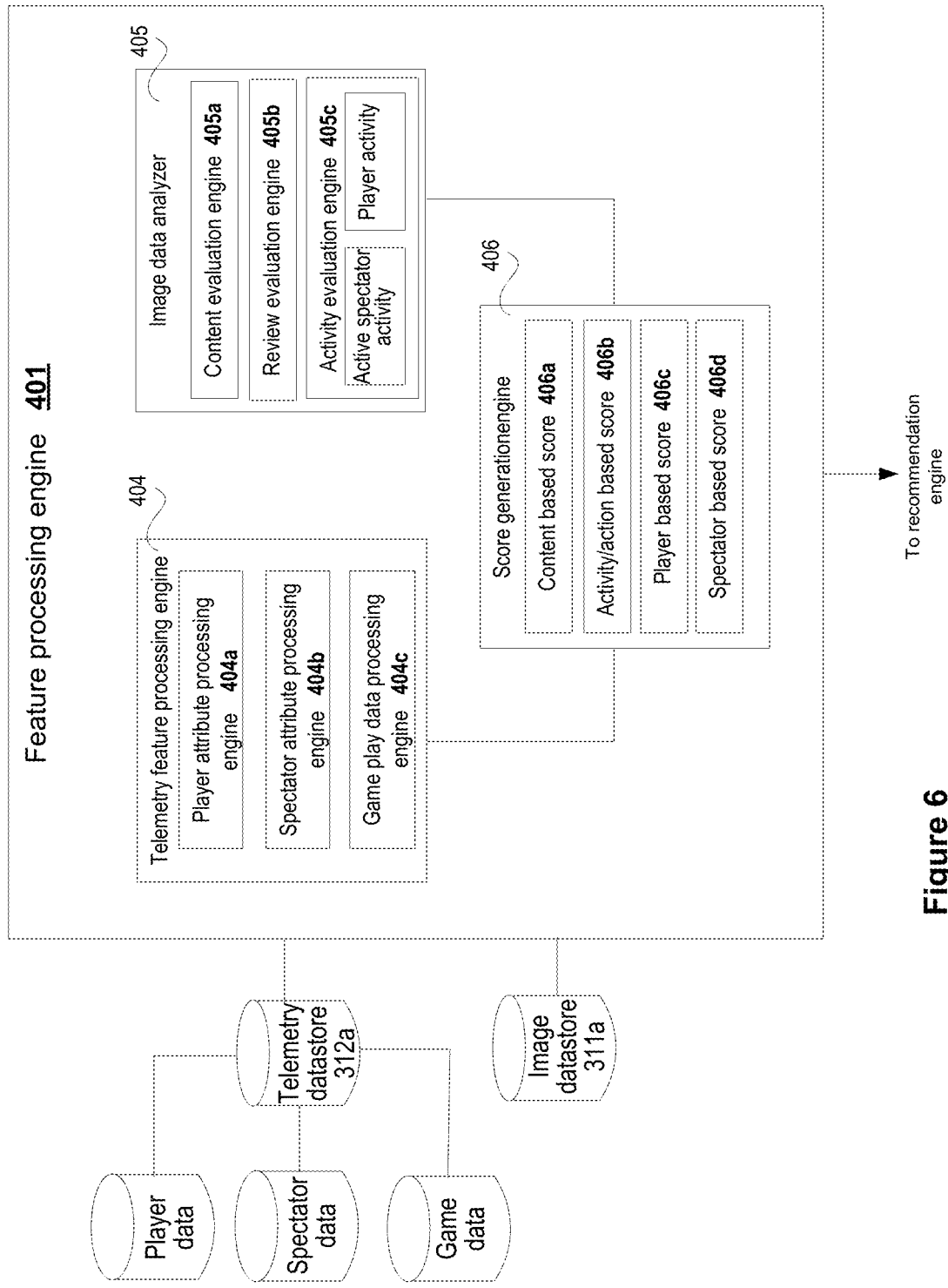
FIG. 6 illustrates a simplified block diagram of different modules within a feature processing engine that is used to extract and evaluate various features of game play data that is provided to a recommendation engine for identifying the different camera views for presenting to a passive spectator, in accordance with one implementation of the present disclosure.

FIG. 6 illustrates the various modules within the feature processing engine that is used to process the various features of the game play as well as the attributes of the players extracted by the respective extraction engines, in one implementation. The feature processing engine 401, in one implementation includes, for example, a telemetry feature processing engine 404, an image data analyzer 405 and a score generation engine 406, to name a few. The telemetry feature processing engine 404 processes the telemetry data 312 extracted from the game play data 308 provided by the game server 302. The telemetry feature processing engine 404 may include a plurality of sub-modules to process the different telemetry data 312. For example, a player attribute processing engine 404*a* within the telemetry feature processing engine 404 may be used to process the data related to player attributes extracted by the player attribute extraction engine 402*a* and stored in the user datastore 305. The player attributes in the user datastore 305 are updated as and when additional player attributes or changes to existing player attributes of a player are detected. The player attributes can be used to gauge the player's playing style, player's popularity, value of game play of the player (e.g., entertainment value, strategy value, player's expertise level, etc.), within the game as well as the game customizations defined by the player. Similarly, a spectator attribute processing engine 404*b* within the telemetry feature processing engine 404 may be used to process the spectator attributes of active spectators extracted by the spectator attribute extraction engine 402*b* and stored in the user datastore 305. The active spectators are those spectators that are actively providing inputs, during game play, to specify the camera view that they would like to view for the different actions. The spectator attributes may be used to define or update additional attributes of the player and/or additional game features of the game.

A game play data processing engine 404c within the telemetry feature processing engine 404 may be used to process the game features extracted by the game play data extraction engine 402c. The game features may be used to determine the game state, game saved data of each player, game popularity with players and/or active spectators, game complexity, etc.

The image data analyzer 405 is used to analyze the image data 311 extracted by the image feature extraction engine 403 and stored in the image datastore 311a, to identify the various features of the game scenes of the game. The features may be related to content of the game scene, actions occurring in the game scene, activity/activities performed by different players in the game scene, and/or quality/complexity of the game scene. The image data analyzer 405 may include a plurality of sub-modules to evaluate the various features included in the image data 311. The evaluation of the image data includes according relevant scores for each image feature identified and using the accorded scores when defining classifiers 410a by the machine learning algorithm 410. Some of the sub-modules of the image data analyzer 405 include content evaluation engine 405a, review evaluation engine 405b, and activity evaluation engine 405c, to evaluate the features of the image data 311. The content evaluation engine 405a is configured to evaluate the image data to identify the content captured within each game scene. The content may include game objects, non-player characters, scenery, challenges, adversaries, collaborators, etc., that provide the overall look of the game scene. The image data related to features may include feature identifier, qualifying characteristics, such as height, weight, length, width, depth, size, appearance, location, physics characteristics (e.g., moving or non-moving, direction of movement, trajectory, speed, etc.), etc. A review evaluation engine 405b of the image data analyzer is configured to evaluate popularity of the game scene of the game based on the number of visits to the game scene by the players registered during game play, number and type of comments received from active spectators that are related to the features identified in the game scene, etc. An activity evaluation engine 405c of the image data analyzer is configured to evaluate various actions occurring in each game scene, activities performed by players in each game scene through game inputs. The evaluation also determines frequency of each activity occurring in each game scene, type and amount of game inputs provided to perform each activity, type of action, duration of action, etc. The review evaluation engine 405b and the activity evaluation engine 405c evaluate the image data that is derived from game inputs from players (e.g., activities, actions, etc.), and inputs from active spectators (e.g., comments, chats, reviews, type and frequency of interactions of the active spectators, etc.). The inputs from active spectators may be used to update profiles of corresponding players and/or game features of corresponding game scenes. The activity evaluation engine 405c is configured to identify and evaluate both player related activity and active spectator related activity.

Information from the telemetry feature processing engine 404 and the image data analyzer 405 are provided as inputs to a score generation engine 406. The score generation engine 406 is configured to generate relevant scores for the different camera views based on the identification and evaluation of the various features and attributes. For example, a content based score 406a may be computed based on the evaluation of content captured in each camera view of a game scene. Similarly, an activity/action based score 406b may be computed for each camera view based on activities performed by players and actions occurring in response to the activities in each game scene captured in the respective camera view. A player based score 406c may be computed for the camera views based on the attributes of a player determined from activities performed in the game scene captured in the respective camera views. A spectator based score 406d may be computed for the different camera views based on inputs provided by the active spectators for each camera view of the game scene. The scores from the score generation engine 406 are associated with the respective camera views and used during generation and tuning of the recommendation model (i.e., AI model) 410b. The scores for the various camera views for different game scenes are updated on an-going basis based on game inputs received from players and inputs from active spectators.

The inputs provided by the active spectators specify game viewing preferences for each action occurring in the game. The game viewing preferences for a game scene may be for capturing an action occurring within a game scene and may specify an angle, a depth, a direction of capture etc., of the action. These viewing preferences may be specific for each action and may be based on the type of action that is occurring in the game scene. The game viewing preferences define the viewing objectives of the spectators and are used to generate specific active spectator camera views for the game.

The recommendation model 410b is fine-tuned using the game inputs of the players and inputs from active spectators collected for the game. The fine-tuning assists in strengthening the inter-relationship between the various features, attributes identified from the game play data. The recommendation model 410b identifies different outputs for different viewing objectives. When a passive spectator selects the game for viewing, an output from the recommendation model 410b is identified that satisfies the viewing objectives of the passive spectator. The viewing objectives may be based on context of the actions occurring in the game scene of the game, and, in some cases, also on the profile of the passive spectator. The profile of the spectator identifies the type of actions, the amount of details of the actions, type camera views (overhead, side view, etc.), etc., that the passive spectator prefers when viewing the game. The details of the viewing preference of the passive spectator are gathered from the viewing history of the passive spectator, wherein the viewing history may be related to game applications and/or any other interactive applications. The output from the recommendation model 410b is used to identify a camera view for each action occurring in the game scene for presenting to the passive spectator. For example, based on the action occurring in the game scene, one or more camera views may be identified for presenting to the passive spectator. When more than one camera view is identified, the viewing preferences of the passive spectator may be used to identify a camera view for the action. The camera view identified for the passive spectator may be same as or different from a PCV. For example, the profile of the passive spectator may show that the passive spectator usually likes to view an overhead camera view of the action, and the appropriate overhead camera view of the action may be presented to the passive spectator for the action. In another example, the passive spectator may wish to be presented with a different camera view for different types of action, such as overhead view of a racing game, a side view for a basketball game, an opposing view for a tennis game, etc. The opposing view, in one implementation, may be defined to be a view that captures the action (e.g., ball served or returned) from the perspective of an opposing player, such as an opponent in the tennis game, while the PCV for the same action may capture the view of the ball moving toward the opposing player as seen from the player's perspective.

In one implementation, the active spectator camera views generated from inputs from the active spectators may be direction based camera views or action based camera views. The score generation engine 406 computes the various feature/user based scores in accordance to the type of ASCVs generated. The computed scores for the different camera views are provided to the machine learning algorithm 410 to further tune the recommendation model 410b so that appropriate camera views can be identified for presenting to the passive spectator. Different camera views are presented to the passive spectator over a course of game play of the video game, wherein each camera view corresponds to change(s) to the actions occurring in the game scene and is presented to the passive spectator for the duration of the change. The camera views presented to the passive spectator are dynamically switched to correspond with the actions occurring in the game scene. The dynamic switching is performed without any inputs from the passive spectator and is designed to provide the passive spectator with camera views that capture the various actions occurring in the game in accordance to the actions occurring and in accordance to the profile of the passive spectator. The camera views presented to the passive spectator are part of a recommendation stream 430.

Even when the same action is occurring in a game scene, the recommendation algorithm may provide different camera views to different passive spectators in their recommendation stream 430. The difference in the camera views from one passive spectator to another may be due to differing viewing preferences specified in their respective profiles. The recommendation model 410b is configured to identify appropriate output taking into consideration the viewing preferences of the different passive spectators. The output identified from the recommendation model 410b is forwarded to the recommendation engine 420. The recommendation engine 420 uses the information provided in the output to identify specific ones of the camera views to return to the passive spectator. The passive spectator gets satisfying game viewing experience based on the camera views presented to them, as the camera views align with their viewing preferences.

FIGS. 7A-1 through 7E-1 illustrate sample switched camera views provided to a plurality of passive spectators for a game by the recommendation engine 420, based on the output identified from the recommendation model. FIG. 7A-1 illustrates one sample switched camera views provided to passive spectator 1. The switched camera views include a combination of player camera views (PCVs) and active spectator camera views (ASCVs). For example, the recommended switched camera views provided to passive spectator PS1 includes PCVs of players with player identifiers 35, 731 in the lead, followed by ASCV16.1, PCVs of player 3 and 42, ASCV20.7 and PCV of player 35. The various camera views are provided by dynamically switching out, in substantial real-time, the existing camera view with a new camera view during the rendering of the video game. Each camera view is rendered for a period of time before being switched, wherein the period of time correlates with the duration of the action occurring in the respective camera views. For example, PCV35 is rendered for 4.5 seconds before being dynamically switched out and replaced by PCV731. PCV731 is rendered for 7.5 seconds starting from 4.5 seconds till 12 seconds into game play, before being switched out and replaced by ASCV16.1. ASCV16.1 is rendered for 7 seconds before being switched out and replaced by PCV3, and so on. In the example recommended switched camera views shown in FIG. 7A-1, the PCV35 is shown twice—one at the beginning and one at the end of the sample. This may indicate that the camera view of player 35 captures image features and/or view of an ongoing action that the passive spectator PS1 likes to watch, and in some instances may also match the preferences of the passive spectator PS1 at different times. The ASCVs presented to the passive spectator identify the game scene of a player that an active spectator was interested in and was generated based on inputs of the active spectator. For example, ASCV16.1 corresponds to active spectator camera view 1 capturing game action in the game scene associated with player 16. Similarly, ASCV20.7 corresponds to active spectator camera view 7 capturing game action in the game scene associated with the game scene of player 20. FIG. 7A-2 shows the resulting stream of camera views that is provided to the passive spectator PS1 during the course of viewing the game play of the video game.

FIG. 7B-1 illustrates another example of a sample switched camera views provided to a second passive spectator PS2, in one implementation. The recommendation stream includes a set of ASCVs 3.5, 73.1 and 16.1 in the lead followed by PCVs of players 3 and 42, ASCV 20.7, PCV of player 3 and ASCV 3.5. As in FIG. 7A-1, certain ones of camera views are repeated. The switched camera views generated for each passive spectator may not only capture the game scene of the game from different angles but may also capture progression of an action occurring in the game scene. The action occurring in the game scene may or may not be in response to game inputs from a player. FIG. 7B-1 illustrates one such example, wherein the ASCV3.5 in the lead may capture the beginning of an action and the same ASCV3.5 in the end may capture progression of the action in the game scene over time. In this example, the ASCVs3.5 in the lead and in the end may be capturing the game scene for the action from the same angle, while the other ASCVs and PCVs may be capturing the game scene associated with the action from different angles (including different heights, different depths, different modes, different directions, etc.). FIG. 7B-2 shows the resulting recommendation stream of camera views that is provided to the passive spectator PS2 during the course of viewing the game play of the video game.

FIG. 7C-1 illustrates another example switched camera views provided to passive spectator PS3 that includes PCV of player 35 followed by a string of ASCVs (ASCV35.7, ASCV6.1, ASCV318.3, ASCV42.8, ASCV20.7, ASCV35.9) and PCV35. In one implementation, all of the camera views included in the switched camera views provided to PS3 may be capturing the same game scene associated with an action or a plurality of actions and each camera view may be presenting the action from different perspectives in accordance to the viewing preferences of the spectator. FIG. 7C-2 shows the resulting recommendation stream of camera views that is provided to the passive spectator PS3 during the course of viewing the game play of the video game.

FIG. 7D-1 illustrates another example of the switched camera views provided to passive spectator PS4, which includes only PCVs of different players capturing view of one or more actions occurring in the game scene of a game. In this example, player 35's PCVs are shown to be both in the lead and in the end of the switched camera views. This may be to show progression of an action occurring within the game scene. FIG. 7D-2 shows the resulting recommendation stream of camera views that is provided to the passive spectator PS4 during the course of viewing the game play of the video game.

FIG. 7E-1 illustrates yet another example in which the switched camera views provided to passive spectator PS5 includes only ASCVs generated from inputs of active spectators capturing one or more actions occurring in the game scene. FIG. 7E-2 shows the resulting recommendation stream of camera views that is provided to the passive spectator PS5 during the course of viewing the game play of the video game. The aforementioned examples are provided as examples to illustrate that the camera views identified for a passive spectator, based on their specified preferences, may include any combination of camera views capturing different actions or different views of the same action.

The various implementations described herein provide ways to enhance a passive spectator's viewing experience by identifying and presenting select ones of camera views of game scenes of game play generated from the game play of a plurality of players. The select ones of camera views are identified based on preferences of the passive spectator specified in their profile and not based on the recommendation of a game logic of the game, which may provide camera views from the perspective of the players or based on popularity of the action or popularity of the camera view. Providing the passive spectators with camera views that are relevant to the passive spectator (i.e., in accordance to what they want to see) for a game can lead to satisfactory viewing experience for the passive spectator, which can lead to viewer retention in the game. Viewer retention can translate to more revenue for game developer, game player, game sponsor, etc.

Figure 8:
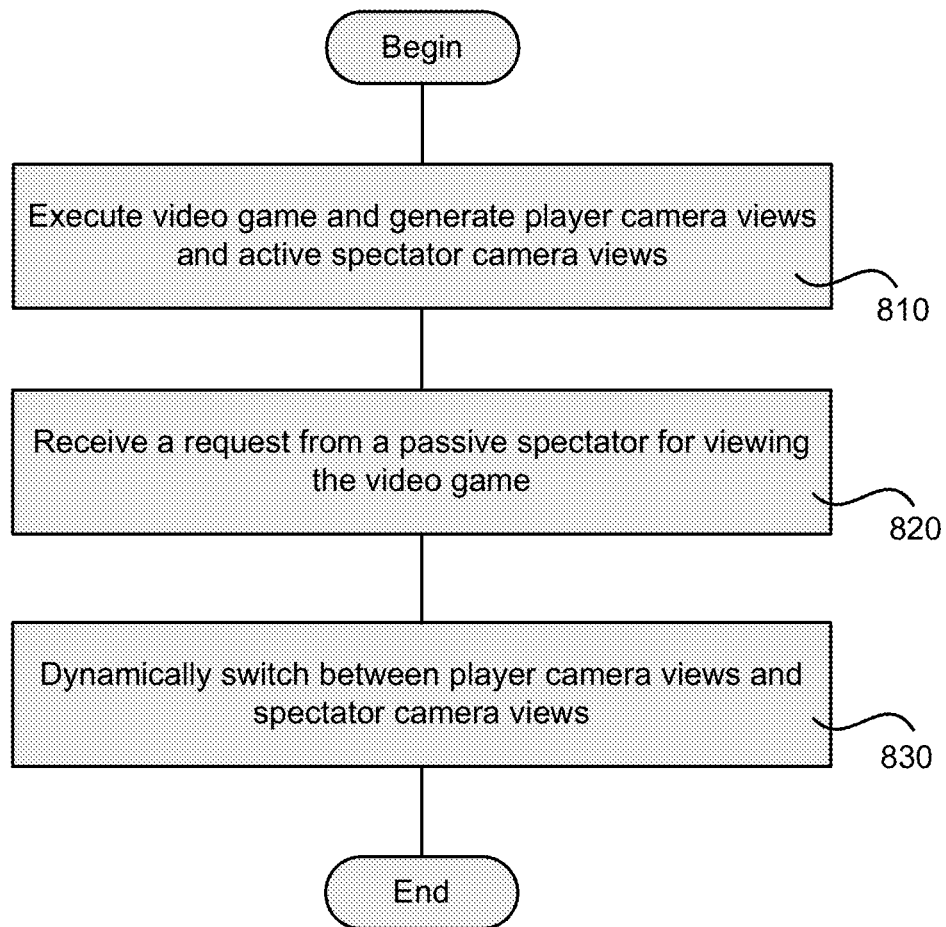
FIG. 8 illustrates a flow diagram of various operations of a method used in generating recommendation stream for returning to a spectator, in accordance with one implementation of the present disclosure.

FIG. 8 illustrates flow of operations of a method for improving viewing experience of a spectator, in one implementation. The method begins with the execution of a video game at a game server, as illustrated in operation 810. The execution of the video game may be in response to a request for game play of the video game received from one or more players. The execution of the video game results in generation of game play data from game inputs provided by the players during game play. The game play data is used to generate camera views, including a player camera view for providing to each of the players, and an active spectator camera view for providing to each active spectator accessing the video game for viewing the game play of the player. The active spectator camera view is generated based on active inputs received from the active spectators, wherein the inputs may specify viewing preferences of the active spectator. The viewing preferences of the active spectator may include angle of capture, depth of capture, direction of capture, clarity of capture, etc. Hence, the active spectator camera view generated for each active spectator is also referred to as active spectator camera view. The game may be a multi-player game played by a plurality of players that are either co-located or remotely location in different geolocations. Game inputs provided by each player are used to affect game state of the game and to generate game play data. The game play data is used to generate a plurality of camera views that capture the different aspects of game scenes of the game. The various camera views generated for a game scene may be used to generate a three-dimensional view of the game scene. The camera views generated from the game play data include frames of content capturing a view of one or more actions occurring in a game scene. The frames of content associated with a player camera view of a player are live streamed to the player.

A request is received from a passive spectator for viewing game play of the video game, as illustrated in operation 820. The request specifies the video game the passive spectator is interested in viewing but does not include any other inputs to influence generation of camera views. Responsive to the request from the passive spectator, a view recommendation engine, executing on the game server, identifies a player camera view and an active spectator camera view that capture a view of an action occurring in the game scene of the video game, for presenting to the passive spectator, in response to the request, as illustrated in operation 830. The player camera view and the active spectator camera view related to the action are generated using game play data available at the time of occurrence of the action. The view recommendation engine then dynamically switches between the player camera view and the active spectator camera view based on context of the action occurring in the player camera view and the active spectator camera view. The dynamic switching is done automatically without requiring any input from the passive spectator. The camera view provided to the passive spectator is in accordance to the type of action captured. In some implementations, the camera view is also based on the viewing preference of the passive spectator collected from viewing history included in the profile of the passive spectator.

Traditionally, the game logic would have presented all of the camera views that were generated for each action in each game scene and the passive spectator had to go through each and every camera view to identify the camera view that captures the game scene in accordance to their preference. Or alternately, the game logic would have presented player camera views of a particular player by matching the profile of the player with the profile of the passive spectator. Such camera views may not be optimal for the passive spectator as the passive spectator may be interested in viewing different perspectives of the game scene where the action is occurring instead of the ones provided by the game logic. The passive spectator may not be interested in generating new camera views by providing inputs like the active spectators but may be interested in viewing camera views that best capture the actions within the game scene.

The various implementations of the present disclosure discussed herein provide the passive spectators with camera views of the different actions occurring in the game by using the camera views that are already generated for the players and active spectators, without having to create their own camera views. The camera views provided to the passive spectators match their viewing preferences and provide views of the actions within the game scene to enable the passive spectators to gain a satisfying game viewing experience.

In some implementations, the passive spectator may be provided with a user interface to update the viewing preferences in their profile. The viewing preferences specify the viewing objective of the passive spectator. The view recommendation engine works with the game logic to select the camera views in accordance to the viewing objectives of the passive spectators. The user interface may include options for the passive spectator to select. The various implementations discussed herein can be used for both a live streaming game and a pre-recorded game play of a game.

In addition to the game play of a game, the various implementations may be extended to real-world content captured and streamed to the spectators. In one implementation, the real-world content may be captured by a plurality of users, wherein the users may be grouped into different teams. Each team of users may be capturing the real-world scene from different angles and forwarding the captured stream to an application cloud server for sharing with other users/spectators. The application cloud server in associated with the view recommendation engine may process the captured content of the real-world scene to identify the various camera views that are capturing actions in the real-world scene and select ones of the camera views, based on the preferences of the passive spectator, to stream to the passive spectator. As with the game play of a game, the real-world scenes captured by the plurality of users may be live streamed to the passive spectators via the application cloud server(s) or alternately a recording of the real-world scene may be stored in the application cloud server and used as and when the passive spectator desires to watch the pre-recorded video of the real-world scene. In the implementation capturing the real-world content, active spectators may be those that provide inputs to influence the content being captured in the camera views. The inputs may be in the form of feedback or instructions to the users capturing the real-world content. Alternate implementations may include receiving real-world content captured by a plurality of users, wherein each user captures the real-world content from a different angle/depth/direction, and using the inputs of the active spectators to identify select ones of the camera views to present to the passive spectator. The passive spectator merely provides the request to view the real-world content, and the view recommendation engine will automatically identify specific ones of the camera views to provide to the passive spectator. The passive spectator can sit back, relax and enjoy the camera views of the game play selected for the passive spectator, which are optimal for the passive spectator.

Figure 9:
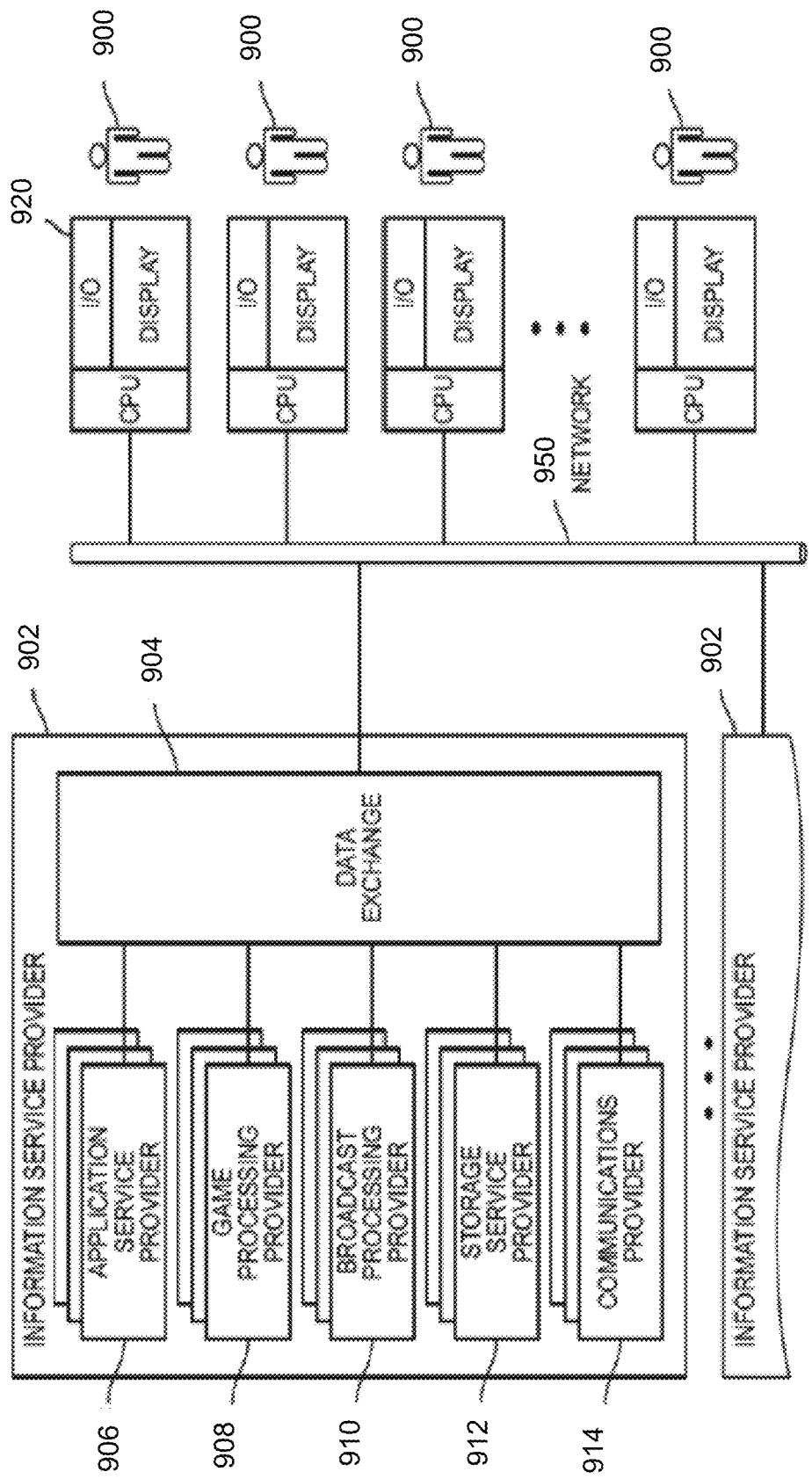
FIG. 9 illustrates an example implementation of an Information Service Provider architecture, in accordance with one implementation of the present disclosure.

FIG. 9 illustrates an embodiment of an Information Service Provider architecture. Information Service Providers (ISP) 902 delivers a multitude of information services to users 900 geographically dispersed and connected via network 950. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 902 includes Application Service Provider (ASP) 906, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 902 includes a Game Processing Server (GPS) 908 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 910 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 912 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 914 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 904 interconnects the several modules inside ISP 902 and connects these modules to users 900 via network 950. Data Exchange 904 can cover a small area where all the modules of ISP 902 are in close proximity, or can cover a large geographic area when the different modules are geographically dispersed. For example, Data Exchange 904 can include a fast Gigabit Ethernet (or faster) within a cabinet of a data center, or an intercontinental virtual area network (VLAN).

Users 900 access the remote services with client device 984 (i.e., client device 100 in FIG. 1), which includes at least a CPU, a memory, a display and I/O. The client device can be a PC, a mobile phone, a netbook, tablet, gaming system, a PDA, etc. In one embodiment, ISP 902 recognizes the type of device used by the client and adjusts the communication method employed. In other cases, client devices use a standard communications method, such as html, to access ISP 902.

Figure 10:
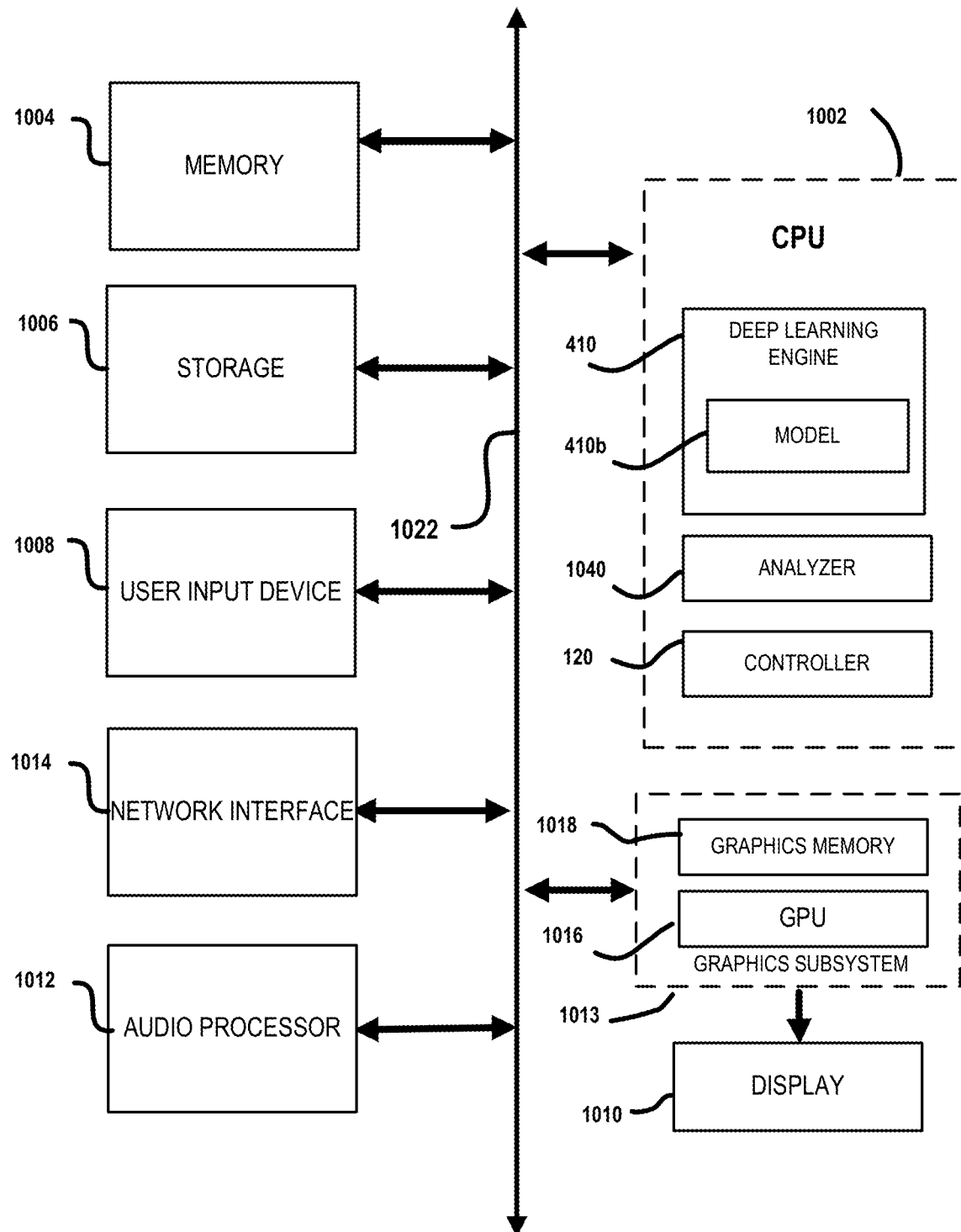
FIG. 10 illustrates a simplified block view of an example cloud game server used to execute an instance of a video game, in accordance with one implementation of the present disclosure.

FIG. 10 illustrates components of an example game server device 302 that can be used to perform aspects of the various embodiments of the present disclosure. For example, FIG. 10 illustrates an exemplary server system with hardware components suitable for training an AI model that is capable of performing various functionalities in relation to a video game and/or game plays of the video game, in accordance with one embodiment of the present disclosure. The block diagram of the server system includes a server device 302 that can incorporate or can be a personal computer, a server computer, gaming console, mobile device, or other digital device, each of which is suitable for practicing an embodiment of the invention. Alternately, the functionalities of the server device 302 could be implemented in a physical server or on a virtual machine or a container server. Server device 302 includes a central processing unit (CPU) 1002 for running software applications and optionally an operating system. CPU 1002 may be comprised of one or more homogeneous or heterogeneous processing cores.

In accordance with various embodiments, CPU 1002 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 1002 may be configured to include the machine learning algorithm 410 (also referred to herein as AI engine or deep learning engine) that is configured to support and/or perform learning operations with regards to providing various functionalities (e.g., predicting, suggesting) in relation to a video game and/or game plays of the video game. The machine learning algorithm 410 may include classifiers 410*a* that are configured for building and/or training an AI model (i.e., recommendation model) 410*b* using inputs and interactions provided during game play of a video game. The AI model 410*b* is configured to provide suggestions for improving engagement metrics of a group of spectators of the video game and/or game plays of the video game. Further, the CPU 1002 includes an analyzer 1040 that is configured for analyzing the inputs and interactions and providing the results of the analysis for generating and training the AI model 410*b*. The trained AI model 410*b* provides an output in response to a particular set of players' inputs, spectators interactions, wherein the output is dependent on the predefined functionality of the trained AI model 410*b*. The trained AI model 410*b* may be used to determine the optimal suggestions to the player and/or the game logic for improving the engagement metrics of the spectators in order to meet the engagement criteria defined for the video game. The analyzer 1040 is configured to perform various functionalities in relation to the video game and/or game plays of the video game, including analyzing the output from the trained AI model 126*b* for a given input (e.g., controller input, game state data, success criteria), and provide a suggestion.

Memory 1004 stores applications and data for use by the CPU 1002. Storage 1006 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1008 communicate players inputs and spectator interactions from one or more players, spectators to server device 302. Examples of user input devices 1008 may include keyboards, mice, joysticks, touch pads, touch screens, still or video recorders/cameras, game controllers, and/or microphones. Network interface 1014 allows server device 302 to communicate with other computer systems via an electronic communications network, and may include wired or wireless communication over local area networks and wide area networks such as the internet. An audio processor 1012 is adapted to generate analog or digital audio output from instructions and/or data provided by the CPU 1002, memory 1004, and/or storage 1006. The components of server device 302, including CPU 1002, memory 1004, data storage 1006, user input devices 1008, network interface 1010, and audio processor 1012 are connected via one or more data buses 1022.

A graphics subsystem 1013 is further connected with data bus 1022 and other components of the server device 301. The graphics subsystem 1013 includes a graphics processing unit (GPU) 1016 and graphics memory 1018. Graphics memory 1018 includes a display memory (e.g., a frame buffer) used for storing pixel data for each pixel of an output image. Graphics memory 1018 can be integrated in the same device as GPU 1016, connected as a separate device with GPU 1016, and/or implemented within memory 1004. Pixel data can be provided to graphics memory 1018 directly from the CPU 1002. Alternatively, CPU 1002 provides the GPU 1016 with data and/or instructions defining the desired output images, from which the GPU 1016 generates the pixel data of one or more output images. The data and/or instructions defining the desired output images can be stored in memory 1004 and/or graphics memory 1018. In an embodiment, the GPU 1016 includes 3D rendering capabilities for generating pixel data for output images from instructions and data defining the geometry, lighting, shading, texturing, motion, and/or camera parameters for a scene. The GPU 1016 can further include one or more programmable execution units capable of executing shader programs. In one embodiment, GPU 1016 may be implemented within AI engine to provide additional processing power, such as for the AI or deep learning functionality.

The graphics subsystem 1013 periodically outputs pixel data for an image from graphics memory 1018 to be displayed on display device 1010, or to be projected by projection system (not shown). Display device 1010 can be any device capable of displaying visual information in response to a signal from the server device 301, including CRT, LCD, plasma, and OLED displays. Server device 301 can provide the display device 1010 with an analog or digital signal, for example.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method, comprising:

receiving a request from a passive spectator for viewing a video game executing at a game cloud server, wherein the video game is a multi-player video game generating game play data using inputs from a plurality of players, the game play data used to generate a player camera view for each player of the plurality of players and an active spectator camera view for each active spectator viewing game play of the video game;

analyzing a user profile of the passive spectator to determine viewing preferences of the passive spectator;

identifying select ones of player camera views and active spectator camera views for forwarding to a client device associated with the passive spectator, for rendering, the specific ones of player camera views and active spectator camera views identified based on the user profile of the passive spectator and correspond to an action currently occurring in the video game during game play, wherein each player camera view of the select ones of the player camera views and each spectator camera view of the select ones of the spectator camera views is distinct and captures a view of the action currently occurring in the video game during game play, and wherein forwarding the select ones of the player camera views and the active spectator camera views includes dynamically switching between a particular one of the select ones of the player camera views and a particular one of the select ones of the active spectator camera views, based on context of the action currently occurring during the game play of the video game, wherein the dynamic switching occurs without input from the passive spectator and wherein operations of the method are performed by a server of a game cloud server.

2. The method of claim 1, wherein the dynamic switching correlates with a change detected in the action occurring in the video game and the particular one of the player camera view or the particular one of the active spectator camera view forwarded to the client device of the passive spectator captures a view of the change in the action.

3. The method of claim 1, wherein the dynamic switching is performed when no change is detected in the action currently occurring within the video game for a pre-defined period, the dynamic switching correlates with an expiration of the pre-defined period, the dynamic switching providing a different perspective view of the action currently occurring in the video game.

4. The method of claim 1, wherein the dynamic switching occurs in substantial real-time.

5. The method of claim 1, wherein the viewing preferences of the passive spectator are collected over time based on content viewed by the passive spectator and dynamically updated to the user profile of the passive spectator.

6. The method of claim 5, wherein the viewing preferences of the passive spectator are dynamically updated in the user profile based on preference inputs received from the passive spectator.

7. The method of claim 1, wherein the viewing preferences of the passive spectator are dynamically updated in the user profile based on preference inputs received from the passive spectator.

8. The method of claim 1, wherein each player camera view of the plurality of players and each active spectator camera view of the active spectators are dynamically updated during game play to capture a view of a change in the action occurring in the video game.

9. The method of claim 1, wherein the action occurring in the video game is based on an activity performed by a player of the plurality of players, and the player camera view and the active spectator camera view capture different perspective views of the action related to the activity.

10. The method of claim 1, wherein the dynamic switching continues during the game play of the video game and results in generation of a recommendation stream that is specific for the passive spectator, wherein the recommendation stream includes a combination of one or more of player camera views and/or one or more active spectator camera views, wherein each player camera view and each active spectator camera view includes a distinct view of the action occurring in the video game.

11. The method of claim 1, wherein a plurality of actions occur during game play of the video game, each action of the plurality of actions being associated with one or more player camera views and one or more active spectator camera views, the one or more player camera views and the one or more active spectator camera views associated with each action capturing distinct views of the corresponding action occurring in the game scene, the one or more player camera views and the one or more active spectator camera views generated for each action include sufficient data to construct a three-dimensional representation of the game scene of the video game associated with the action.

12. The method of claim 1, wherein each player camera view captures a view of the action occurring in the video game from a perspective of a player of the plurality of players, and wherein each active spectator camera view captures a view of the action that is different from the view of the action captured in the player camera view of each of the plurality of players, the active spectator camera view generated for an active spectator is based on the context of the action and an input provided by the active spectator.

13. The method of claim 12, wherein the action occurring in the video game is in response to game inputs provided by the player.

14. The method of claim 1, wherein the dynamic switching includes presenting the player camera view or the active spectator camera view selected for the passive spectator, for a duration of the action occurring in the video game.

15. The method of claim 1, wherein the game play data is an aggregate game play data that includes game play data generated from game play of a plurality of players that are currently playing the video game, the aggregate game play data is used to generate player camera views for the plurality of players and active spectator camera views for a plurality of active spectators for each action occurring in the video game, wherein each player camera view captures view of the video game from a perspective of a specific player of the plurality of players using game inputs of the specific player, and each active spectator camera view captures a view of the video game in accordance to view specification provided in input of a specific active spectator of the plurality of active spectators, and wherein the dynamic switching includes switching between, (a) the player camera views only, or (b) the active spectator camera views only, or (c) the player camera views and the active spectator camera views, so as to provide views of game scenes associated with different actions occurring in the video game.

* * * * *